(12) United States Patent
Paladugu et al.

(10) Patent No.: US 11,764,904 B2
(45) Date of Patent: Sep. 19, 2023

(54) CONTROL INFORMATION FOR NETWORK CODED SIDELINK TRANSMISSIONS

(71) Applicant: QUALCOMM Incorporated, San Diego, CA (US)

(72) Inventors: Karthika Paladugu, San Diego, CA (US); Hong Cheng, Basking Ridge, NJ (US); Gabi Sarkis, San Diego, CA (US); Kapil Gulati, Belle Mead, NJ (US); Gavin Bernard Horn, La Jolla, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/397,574

(22) Filed: Aug. 9, 2021

(65) Prior Publication Data

US 2022/0052788 A1    Feb. 17, 2022

Related U.S. Application Data

(60) Provisional application No. 63/065,955, filed on Aug. 14, 2020.

(51) Int. Cl.
*H04L 1/16* (2023.01)
*H04L 1/1607* (2023.01)
*H04L 1/1867* (2023.01)
*H04W 92/18* (2009.01)

(52) U.S. Cl.
CPC ............ *H04L 1/1642* (2013.01); *H04L 1/189* (2013.01); *H04L 1/1896* (2013.01); *H04W 92/18* (2013.01)

(58) Field of Classification Search
CPC ..... H04L 1/1642; H04L 1/189; H04L 1/1896; H04L 1/0041; H04L 1/1893; H04L 1/0076; H04W 92/18
See application file for complete search history.

(56) References Cited

U.S. PATENT DOCUMENTS

| 2016/0337723 | A1* | 11/2016 | Graves | H04Q 11/0005 |
|---|---|---|---|---|
| 2018/0310333 | A1* | 10/2018 | Akkarakaran | H04W 72/1268 |
| 2020/0274651 | A1* | 8/2020 | Yi | H04W 28/065 |

* cited by examiner

*Primary Examiner* — Jamal Javaid
(74) *Attorney, Agent, or Firm* — Holland & Hart LLP

(57) ABSTRACT

Methods, systems, and devices for wireless communications are described to support transmitting a network coded combined message to a second wireless device that may have missed at least one sidelink message included in another network coded combined message. A first wireless device may identify that the sidelink messages are configured for network coding based on information associated with the sidelink messages. Control information associated with the network coded combined message may indicate that the network coded message is a network coded combined retransmission of the sidelink messages, and may further include information identifying the sidelink messages and devices that transmitted the sidelink messages. The first wireless device may combine the sidelink messages into the network coded combined message and may transmit the control information and the associated network coded combined sidelink message to the second wireless device, which may support decoding of one or more missed sidelink messages.

30 Claims, 21 Drawing Sheets

CONTROL INFORMATION FOR NETWORK CODED SIDELINK TRANSMISSIONS

CROSS REFERENCE

The present Application for Patent claims the benefit of U.S. Provisional Patent Application No. 63/065,955 by Paladugu et al., entitled "CONTROL INFORMATION FOR NETWORK CODED SIDELINK TRANSMISSIONS," filed Aug. 14, 2020, assigned to the assignee hereof, and expressly incorporated by reference herein.

FIELD OF TECHNOLOGY

The following relates to wireless communications, including control information for network coded sidelink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with one or more other UEs via a sidelink channel (e.g., sidelink transmissions over the sidelink channel). In some cases, a message transmitted over a sidelink channel may fail to be received by an intended recipient UE.

SUMMARY

The described techniques relate to improved methods, systems, devices, and apparatuses that support control information for network coded sidelink transmissions. Generally, the described techniques provide for network coding to combine sidelink messages received at a first wireless device that supports network coding (e.g., a relay device, a user equipment (UE), an integrated access and backhaul (IAB) node, a roadside unit (RSU)) for retransmission. The first wireless device may, for example, receive one or more sidelink messages from a wireless device that supports network coding (e.g., one or more transmitting UEs) and may identify (e.g., based on information associated with the sidelink messages) that the sidelink messages include a network coding request. The first wireless device may network code the sidelink messages into a network coded combined sidelink message, and may transmit the network coded combined message along with control information used by a second wireless device that supports network coding (e.g., a receiving UE) to decode the network coded combined message. The first wireless device may transmit the network coded combined message to the second wireless device that may have missed, or may not have been able to successfully decode, one or more of the initial sidelink messages when originally transmitted by the one or more transmitting devices.

The control information may indicate that the network coded combined message is a network coded combined retransmission of the sidelink messages, and may further include information identifying the sidelink messages and the device(s) that originally transmitted the sidelink messages. In some cases, the information identifying sidelink messages may include a sequence number associated with the sidelink messages that have been network coded to generate the network coded combined retransmission. The first wireless device may transmit the control information and the associated network coded combined message to the second wireless device (e.g., to one or more receiving UEs), which may support decoding of one or more sidelink messages at the second wireless device.

A method of wireless communication at a first wireless device is described. The method may include receiving, via a sidelink channel, a first sidelink message having a first sequence number and addressed to a second wireless device, receiving, via the sidelink channel, a second sidelink message having a second sequence number and addressed to the second wireless device, networking coding the first and second sidelink messages to generate a network coded combined message, transmitting, via the sidelink channel, control information indicating the first sequence number of the first sidelink message, the second sequence number of the second sidelink message, and that the network coded combined message is a retransmission of the first and second sidelink messages, and transmitting, via the sidelink channel, the network coded combined message.

An apparatus for wireless communication at a first wireless device is described. The apparatus may include a processor, memory coupled with the processor, and instructions stored in the memory. The instructions may be executable by the processor to cause the apparatus to receive, via a sidelink channel, a first sidelink message having a first sequence number and addressed to a second wireless device, receive, via the sidelink channel, a second sidelink message having a second sequence number and addressed to the second wireless device, network coding the first and second sidelink messages to generate a network coded combined message, transmit, via the sidelink channel, control information indicating the first sequence number of the first sidelink message, the second sequence number of the second sidelink message, and that the network coded combined message is a retransmission of the first and second sidelink messages, and transmit, via the sidelink channel, the network coded combined message.

Another apparatus for wireless communication at a first wireless device is described. The apparatus may include means for receiving, via a sidelink channel, a first sidelink message having a first sequence number and addressed to a second wireless device, receiving, via the sidelink channel, a second sidelink message having a second sequence number and addressed to the second wireless device, networking coding the first and second sidelink messages to generate a network coded combined message, transmitting, via the sidelink channel, control information indicating the first sequence number of the first sidelink message, the second sequence number of the second sidelink message, and that the network coded combined message is a retransmission of the first and second sidelink messages, and transmitting, via the sidelink channel, the network coded combined message.

A non-transitory computer-readable medium storing code for wireless communication at a first wireless device is described. The code may include instructions executable by a processor to receive, via a sidelink channel, a first sidelink message having a first sequence number and addressed to a second wireless device, receive, via the sidelink channel, a second sidelink message having a second sequence number and addressed to the second wireless device, network coding the first and second sidelink messages to generate a network coded combined message, transmit, via the sidelink channel, control information indicating the first sequence number of the first sidelink message, the second sequence number of the second sidelink message, and that the network coded combined message is a retransmission of the first and second sidelink messages, and transmit, via the sidelink channel, the network coded combined message.

Some examples of the method, apparatuses, and non-transitory computer-readable medium described herein may further include operations, features, means, or instructions for receiving a capability indication that the second wireless device supports network coding for relayed transmissions, where the network coded combined message may be transmitted to the second wireless device via the sidelink channel based on the capability indication.

Some examples of the method, apparatuses, and non-transitory computer-readable medium described herein may further include operations, features, means, or instructions for transmitting the control information that indicates a feedback process identifier (PID) associated with the network coded combined message.

Some examples of the method, apparatuses, and non-transitory computer-readable medium described herein may further include operations, features, means, or instructions for receiving a negative feedback message associated with the feedback PID, and transmitting, based on the negative feedback message, a retransmission of the network coded combined message.

Some examples of the method, apparatuses, and non-transitory computer-readable medium described herein may further include operations, features, means, or instructions for transmitting an indication of a supported number of retransmissions for the network coded combined message, where the network coded combined message may be transmitted in accordance with the indication of the supported number of retransmissions.

Some examples of the method, apparatuses, and non-transitory computer-readable medium described herein may further include operations, features, means, or instructions for transmitting the control information that indicates a network coding algorithm applied to generate the network coded combined message.

Some examples of the method, apparatuses, and non-transitory computer-readable medium described herein may further include operations, features, means, or instructions for transmitting the control information that indicates a source identifier (ID) of a wireless device that transmitted the first sidelink message, the second sidelink message, or both.

Some examples of the method, apparatuses, and non-transitory computer-readable medium described herein may further include operations, features, means, or instructions for receiving one or more negative feedback messages addressed to one or more wireless devices that transmitted one or both of the first and second sidelink messages, where the network coded combined message may be transmitted based on the one or more negative feedback messages.

Some examples of the method, apparatuses, and non-transitory computer-readable medium described herein may further include operations, features, means, or instructions for receiving a feedback report including the one or more negative feedback messages, where network coding the first and second sidelink messages may be based on the feedback report.

Some examples of the method, apparatuses, and non-transitory computer-readable medium described herein may further include operations, features, means, or instructions for receiving a negative feedback message that indicates a feedback ID associated with one of the first and second sidelink messages and one of the first and second sequence numbers, where the network coded combined message may be transmitted based on the negative feedback message.

In some examples of the method, apparatuses, and non-transitory computer-readable medium described herein, the network coded combined message includes a protocol data unit (PDU) for a medium access control (MAC) layer, a radio link control (RLC) layer, a packet data convergence protocol (PDCP) layer, or any combination thereof.

In some examples of the method, apparatuses, and non-transitory computer-readable medium described herein, the first sequence number and the second sequence number may be associated with a respective PDU.

In some examples of the method, apparatuses, and non-transitory computer-readable medium described herein, the network coded combined message may be transmitted via a unicast sidelink transmission or a groupcast sidelink transmission.

Some examples of the method, apparatuses, and non-transitory computer-readable medium described herein may further include operations, features, means, or instructions for networking coding the first and second sidelink messages based on receiving the first and second sidelink messages within a same time window.

Some examples of the method, apparatuses, and non-transitory computer-readable medium described herein may further include operations, features, means, or instructions for receiving the first sidelink message via a first unicast connection with a third wireless device, the first sidelink message addressed to a fourth wireless device, and receiving the second sidelink message via a second unicast connection with the third wireless device, the second sidelink message addressed to the third wireless device.

Some examples of the method, apparatuses, and non-transitory computer-readable medium described herein may further include operations, features, means, or instructions for transmitting the control information as sidelink control information.

In some examples of the method, apparatuses, and non-transitory computer-readable medium described herein, the sidelink control information includes a format SCI-1, a format SCI-2, or a different sidelink control information format.

Some examples of the method, apparatuses, and non-transitory computer-readable medium described herein may further include operations, features, means, or instructions for transmitting the control information in a header of the network coded combined message.

Some examples of the method, apparatuses, and non-transitory computer-readable medium described herein may further include operations, features, means, or instructions for transmitting the control information that includes the first sequence number, the second sequence number, or both, in a sequence number field of the header.

A method of wireless communication at a second wireless device is described. The method may include transmitting, to a first wireless device via a sidelink channel, an indication that the second wireless device supports network coding for relayed transmissions, receiving, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receiving, via the sidelink channel, the network coded combined message, and decoding the network coded combined message to obtain the first sidelink message, the second sidelink message, or both, based on the control information.

An apparatus for wireless communication at a second wireless device is described. The apparatus may include a processor, memory coupled with the processor, and instructions stored in the memory. The instructions may be executable by the processor to cause the apparatus to transmit, to a first wireless device via a sidelink channel, an indication that the second wireless device supports network coding for relayed transmissions, receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receive, via the sidelink channel, the network coded combined message, and decode the network coded combined message to obtain the first sidelink message, the second sidelink message, or both, based on the control information.

Another apparatus for wireless communication at a second wireless device is described. The apparatus may include means for transmitting, to a first wireless device via a sidelink channel, an indication that the second wireless device supports network coding for relayed transmissions, receiving, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receiving, via the sidelink channel, the network coded combined message, and decoding the network coded combined message to obtain the first sidelink message, the second sidelink message, or both, based on the control information.

A non-transitory computer-readable medium storing code for wireless communication at a second wireless device is described. The code may include instructions executable by a processor to transmit, to a first wireless device via a sidelink channel, an indication that the second wireless device supports network coding for relayed transmissions, receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receive, via the sidelink channel, the network coded combined message, and decode the network coded combined message to obtain the first sidelink message, the second sidelink message, or both, based on the control information.

Some examples of the method, apparatuses, and non-transitory computer-readable medium described herein may further include operations, features, means, or instructions for receiving the control information that indicates a feedback PID associated with the network coded combined message.

Some examples of the method, apparatuses, and non-transitory computer-readable medium described herein may further include operations, features, means, or instructions for transmitting a negative feedback message associated with the feedback PID, and receiving, based on the negative feedback message, a retransmission of the network coded combined message.

Some examples of the method, apparatuses, and non-transitory computer-readable medium described herein may further include operations, features, means, or instructions for receiving an indication of a supported number of retransmissions for the network coded combined message, where the network coded combined message may be received in accordance with the indication of the supported number of retransmissions.

Some examples of the method, apparatuses, and non-transitory computer-readable medium described herein may further include operations, features, means, or instructions for receiving the control information that indicates a network coding algorithm applied to generate the network coded combined message.

Some examples of the method, apparatuses, and non-transitory computer-readable medium described herein may further include operations, features, means, or instructions for receiving the control information that indicates a source ID of a wireless device that transmitted the first sidelink message, the second sidelink message, or both.

Some examples of the method, apparatuses, and non-transitory computer-readable medium described herein may further include operations, features, means, or instructions for transmitting one or more negative feedback messages addressed to one or more wireless devices that transmitted one or both of the first and second sidelink messages, where the network coded combined message may be received based on the one or more negative feedback messages.

Some examples of the method, apparatuses, and non-transitory computer-readable medium described herein may further include operations, features, means, or instructions for transmitting a feedback report including the one or more negative feedback messages, where the network coded combined message may be received based on the feedback report.

Some examples of the method, apparatuses, and non-transitory computer-readable medium described herein may further include operations, features, means, or instructions for transmitting a negative feedback message that indicates a feedback ID associated with one of the first and second sidelink messages and one of the first and second sequence numbers, where the network coded combined message may be received based on the negative feedback message.

In some examples of the method, apparatuses, and non-transitory computer-readable medium described herein, the network coded combined message includes a PDU for a MAC layer, an RLC layer, a PDCP layer, or any combination thereof.

In some examples of the method, apparatuses, and non-transitory computer-readable medium described herein, the first sequence number and the second sequence number may be associated with a respective PDU.

In some examples of the method, apparatuses, and non-transitory computer-readable medium described herein, the network coded combined message may be received via a unicast sidelink transmission or a groupcast sidelink transmission.

Some examples of the method, apparatuses, and non-transitory computer-readable medium described herein may further include operations, features, means, or instructions for receiving the control information as sidelink control information.

In some examples of the method, apparatuses, and non-transitory computer-readable medium described herein, the sidelink control information includes a format SCI-1, a format SCI-2, or a different sidelink control information format.

Some examples of the method, apparatuses, and non-transitory computer-readable medium described herein may further include operations, features, means, or instructions for receiving the control information in a header of the network coded combined message.

Some examples of the method, apparatuses, and non-transitory computer-readable medium described herein may further include operations, features, means, or instructions for receiving the control information that includes the first sequence number, the second sequence number, or both, in a sequence number field of the header.

DETAILED DESCRIPTION

Figure 1:
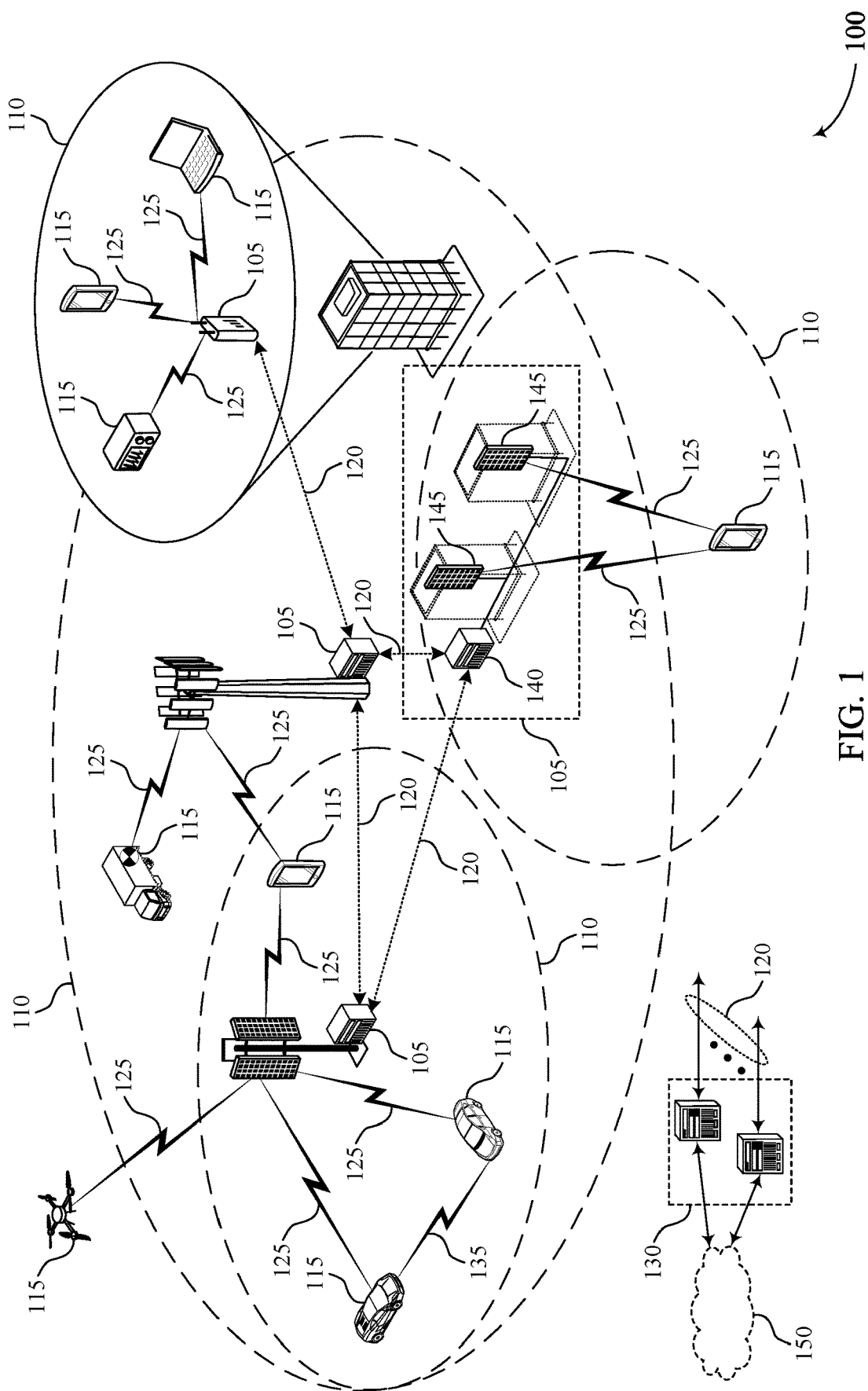
FIG. 1 illustrates an example of a wireless communications system in accordance with aspects of the present disclosure.

Wireless devices may communicate with each other using sidelink transmissions over a sidelink channel. For example, a first wireless device that supports network coding (e.g., a relay device, a user equipment (UE), an integrated access and backhaul (IAB) node) may perform sidelink transmissions, over a sidelink channel, to a second wireless device that supports network coding (e.g., a UE). In some cases, a UE may also represent a relay device, which may, in some cases, represent a higher reliability UE or an enhanced capability UE configured to relay sidelink messages between UEs. In some cases, a sidelink message may fail to be received or decoded by one or more second wireless devices. In order to support reception of missed sidelink messages, a transmitting device may retransmit a sidelink message based on negative feedback from a receiving device, or may retransmit a sidelink message blindly (e.g., without waiting for feedback). Waiting for feedback before retransmitting a sidelink message may result in increased latency, however, and blindly retransmitting a sidelink message may result in increased resource use.

The present disclosure provides techniques for network coding sidelink messages (e.g., associated with a same transmitting device or with different transmitting devices) at a first wireless device (e.g., a relay device or a UE) for retransmission. The first wireless device may transmit a network coded combined message to a second wireless device (e.g., a UE) that may have missed, or was unable to successfully decode, one or more of the sidelink messages that were initially transmitted by one or more transmitting devices to the first wireless device. The first wireless device may, for example, receive the initial sidelink messages from one or more transmitting devices and may identify (e.g., based on information associated with the sidelink messages) that the sidelink messages include a request for network coding. The first wireless device may network code the sidelink messages to generate a network coded combined message and may generate control information used by the second wireless device to decode the network coded combined message.

The control information may indicate that the network coded combined message is a network coded combined retransmission of the sidelink messages, and may further include information identifying the sidelink messages and the device(s) that transmitted the sidelink messages. In some cases, the information identifying sidelink messages may include a sequence number associated with the respective sidelink message. The first wireless device may transmit the control information and the associated network coded combined message to the second wireless device (e.g., to one or more receiving UEs), which may support decoding of one or more sidelink messages from the network coded combined message by the second wireless device. These techniques may reduce resource use (e.g., by retransmitting one message instead of two or more messages) and increase reliability within a wireless communications system.

The first wireless device may transmit the network coded combined message and corresponding control information to the second wireless device (e.g., and to any other devices that may have missed sidelink message), based on at least one of the sidelink messages being addressed to the second wireless device. The second wireless device may receive the network coded combined message and corresponding control information and may use the network coded combined message and corresponding control information to decode one or more sidelink messages from the network coded combined message. The second wireless device may also cache one or more other received sidelink messages and may use the network coded combined message to recover a sidelink message (e.g., sidelink message). For example, the second wireless device may have received and decoded the content of a first sidelink message (e.g., which is also included in network coded combined message) but not a second sidelink message transmitted by the transmitting device. The second wireless device may derive a second sidelink message from network coded combined message received from the first wireless device.

Aspects of the disclosure are initially described in the context of wireless communications systems. Aspects of the disclosure are further illustrated by and described with reference to protocol stack schemes, signaling schemes, a header configuration, apparatus diagrams, system diagrams, and flowcharts that relate to control information for network coded sidelink transmissions.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, enhanced V2X (eV2X) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may communicate with each other using sidelink transmissions (e.g., over a sidelink channel). A UE 115 may also represent a relay device, which may, in some cases, represent a higher reliability UE 115 or an enhanced capability UE 115 configured to relay sidelink messages between UEs 115. In some cases, one or more recipient UEs 115 may fail to receive or decode a sidelink message transmitted by a transmitting UE 115. A relay device UE 115 may receive the sidelink message, and may perform network coding to combine sidelink messages (e.g., associated with a same transmitting UE 115 or with different transmitting UEs 115) into a network coded combined message. The relay device may, for example, receive an initial sidelink message from one or more transmitting UEs 115 that include a request for network coding based on information included in the sidelink message. The relay device may network code multiple sidelink messages into a network coded combined message and generate control information used to decode the network coded combined message. The relay device may transmit the network coded combined message and the control information to a receiving UE 115 that may have missed, or may not have been able to successfully decode, one or more of the sidelink messages transmitted by the transmitting UE 115.

The control information may indicate that the network coded combined message is a network coded combined retransmission of the sidelink messages, and may further include information identifying the sidelink messages and the UE(s) 115 that transmitted the sidelink messages. In some cases, the information identifying the sidelink messages may include a sequence number for the respective sidelink messages. The relay device may transmit the control information and the associated network coded combined message to the receiving UE 115 (e.g., to one or more receiving UEs 115). A receiving UE 115 may use the control information to determine which sidelink messages are included in the network coded combined message for determining whether to decode the network coded combined message. For example, the receiving UE 115 may process the control information to identify a sequence number of each sidelink message within the network coded combined message. Based on the identified sequence numbers, the receiving UE 115 may determine to decode the network coded combined message to obtain one or more sidelink messages that the receiving UE may have missed or was unable to previously decode from a prior transmission by a transmitting UE to the receiving UE. These techniques may reduce resource use (e.g., by retransmitting one message instead of two or more messages) and increase reliability within a wireless communications system.

Figure 2:
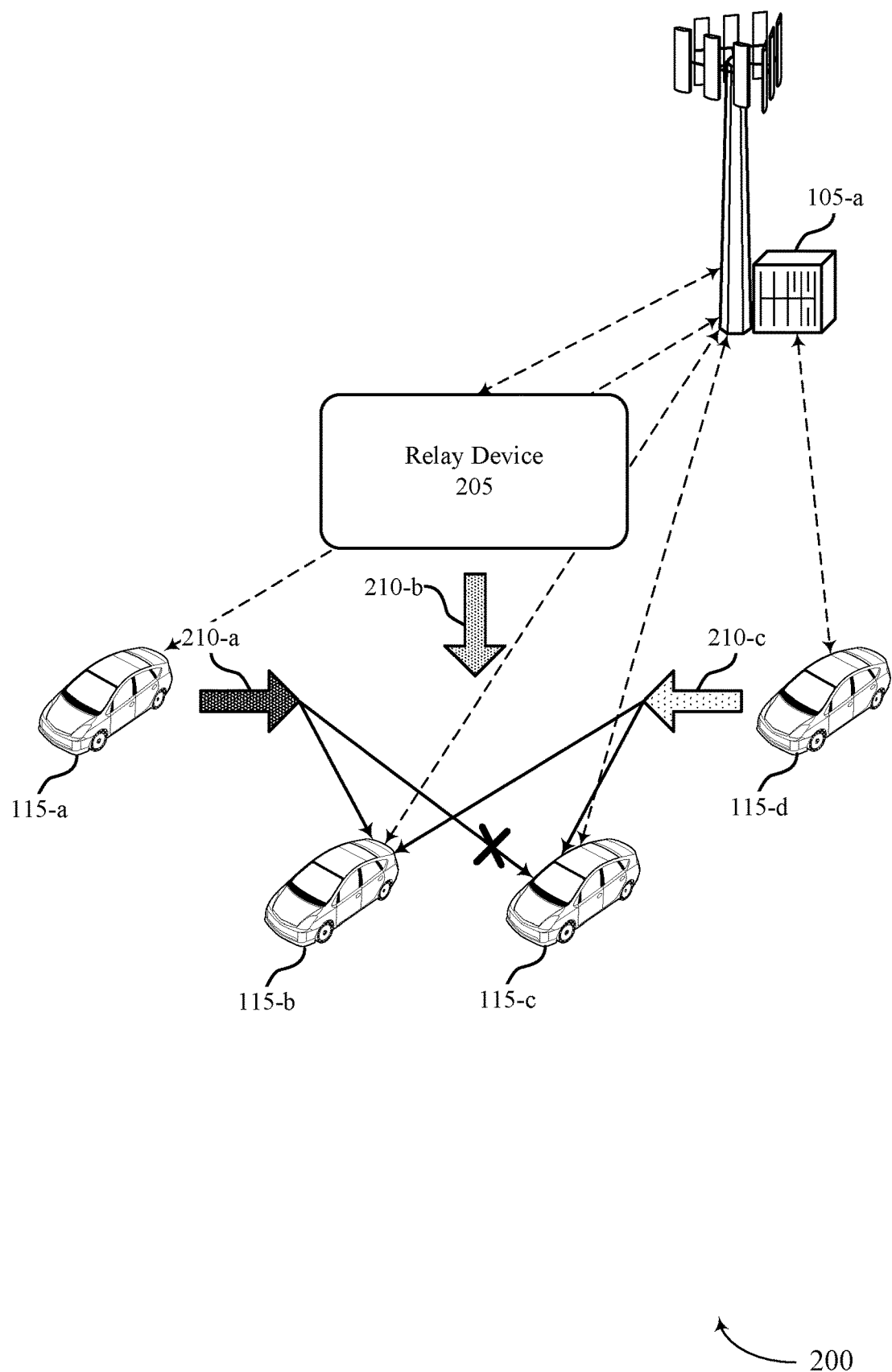
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. For example, wireless communications system 200 may include multiple UEs 115 and, in some cases, a base station 105-a, which may respectively represent examples of UEs 115 and a base station 105 described with reference to FIG. 1. In some cases, the UEs 115 may communicate with base station 105-a. The UEs 115 may include UEs 115-a, 115-b, 115-c, and 115-d, that may communicate with each other using sidelink transmissions (e.g., over a sidelink channel), an example of which may be included within a group of vehicles. Wireless communications system 200 may also include a relay device 205, which may, in some cases, also may be a UE 115. In some examples, the relay device 205 may be a higher reliability UE 115, an enhanced capability UE 115, or other type of UE 115. In some examples, the relay device 205 may be a roadside unit (RSU).

The UEs 115 may communicate with one another by transmitting broadcast or unicast sidelink messages 210. For example, UE 115-a may transmit a sidelink message 210-a to UEs 115-b and 115-c and UE 115-d may transmit a sidelink message 210-c to UEs 115-b and 115-c. Relay device 205 may transmit a sidelink message 210-b to any of UEs 115-a, 115-b, 115-c, and 115-d. In some cases, a sidelink message 210 may fail to be received or decoded by one or more recipient UEs 115. For example, UE 115-c may fail to receive or decode sidelink message 210-a. In some cases, UE 115-c may transmit a negative acknowledgement in response to the failure to receive or decode sidelink message 210-a.

In order to support reception of missed sidelink messages 210 (e.g., sidelink message 210-a), a transmitting UE 115 may retransmit a sidelink message 210 based on negative feedback from a receiving UE 115, or may retransmit a sidelink message 210 blindly (e.g., without waiting for feedback). Waiting for feedback before retransmitting a sidelink message 210 may result in increased latency, however, and blindly retransmitting a sidelink message 210 may result in increased resource use.

The present disclosure provides techniques for combining missed sidelink messages 210 at a relay device 205, which may be referred to as network coding (e.g., connection-less network coding), and transmitting the network coded combined message 210 to a receiving UE 115 that may have missed one or more of the sidelink messages 210. The relay device 205 may, for example, receive the initial sidelink messages 210 from one or more transmitting UEs 115 and may identify (e.g., based on information included in the sidelink messages 210) that the sidelink messages 210 include a request for network coding. The relay device 205 may network code the sidelink messages 210 into a network coded combined message 210, which may be correspond to control information (e.g., network coding control information). The missed sidelink messages 210 may be transmitted from a same transmitting UE 115 or with different transmitting UEs 115.

The control information may indicate that the network coded combined message 210 is a network coded retransmission of the sidelink messages 210, and may further include information identifying the sidelink messages 210 and the UE(s) 115 that transmitted the sidelink messages 210. The relay device may transmit the control information and the associated network coded combined message 210 to the receiving UE 115 (e.g., to one or more receiving UEs 115), which may support decoding of one or more sidelink messages 210 at the receiving UE 115. These techniques may reduce resource use (e.g., by retransmitting one message instead of two or more) and increase reliability within wireless communications system 200 (e.g., by reducing a channel busy ratio (CBR)).

In the example illustrated by FIG. 2, sidelink messages 210-a and 210-c (e.g., or control information for sidelink messages 210-a and 210-c) may respectively include an indication that the corresponding sidelink message 210 is configured for network coding. In some cases, UE 115-c may fail to receive or decode sidelink message 210-a from UE 115-a. Similarly, one or more other UEs 115 may fail to receive or decode sidelink message 210-c from UE 115-d. Relay device 205 may receive sidelink messages 210-a and 210-c, may identify that the sidelink messages 210 are configured for network coding (e.g., based on the corresponding indications), and may combine sidelink messages 210-a and 210-c into a network coded combined message 210-b. The relay device 205 may transmit network coded combined message 210-b to any intended recipients of sidelink messages 210-a and 210-b that may have failed to receive or decode those sidelink messages 210 (e.g., UE 115-c).

In some examples, relay device 205 may cache sidelink messages 210-a and 210-c based on the sidelink messages 210 including a request for network coding. In some examples, relay device 205 may cache multiple (e.g., all) sidelink messages 210 requesting network coding that are transmitted within a time period (e.g., a time window). Relay device 205 may use the cached sidelink messages 210-a and 210-c to network code and transmit network coded combined sidelink message 210-b.

In some cases, relay device 205 may perform network coding and transmission of sidelink message 210-b based on feedback (e.g., HARQ feedback) for sidelink message 210-a and/or sidelink message 210-c. For example, relay device 205 may decode a respective feedback channel (e.g., physical sidelink feedback channel (PSFCH)) directed to each transmitting UE 115 (e.g., UEs 115-a and 115-d). Relay device 205 may use the feedback information from the respective feedback channel(s) to determine which sidelink messages 210 to combine into network coded combined message 210-b. For example, UE 115-c may transmit, to UE 115-a, negative feedback information (e.g., a negative feedback message) including a HARQ process identifier (PID) for sidelink message 210-a (e.g., indicating that UE 115-c failed to receive or decode sidelink message 210-a). In some cases, UE 115-c may also transmit, to UE 115-d, negative feedback information (e.g., a negative feedback message) including a HARQ PID for sidelink message 210-b (e.g., indicating that UE 115-c failed to receive or decode sidelink message 210-c).

Relay device 205 may determine (e.g., based on the negative feedback message transmitted from UE 115-c to UE 115-a) that UE 115-c missed sidelink message 210-a and may determine to include sidelink message 210-a in network coded combined message 210-b. Similarly, relay device 205 may determine that one or more UEs 115 (e.g., including UE 115-c) missed sidelink message 210-c (e.g., based on a respective negative feedback indication to UE 115-d) and may determine to include sidelink message 210-c in network coded combined message 210-b.

In some cases, relay device 205 may determine to transmit network coded combined message 210-b based on a capability of UEs 115 that may have failed to receive or decode sidelink message 210-a and/or 210-b. For example, UE 115-c may transmit (e.g., via a sidelink channel) a capability indication to the relay device 205, indicating that UE 115-c supports network coded relay transmissions. The relay device 205 may determine, based on the capability of UE 115-c, to generate network coded combined message 210-b and transmit network coded combined message 210-b to UE 115-c.

Relay device 205 may also determine control information for the network coded combined message 210-b. The control information may indicate that the network coded combined message 210-b is a network coded retransmission of sidelink messages 210-a and 210-c, and may further include information identifying sidelink messages 210-a and 210-c and the corresponding UEs 115-a and 115-d that transmitted the sidelink messages 210. Relay device 205 may transmit the network coded combined message 210-b and corresponding control information to UE 115-c (e.g., and to any other UE 115 that may have missed sidelink message 210-a or 210-c), based on at least one of the sidelink messages being addressed to UE 115-c. UE 115-c may receive the network coded combined message 210-b and corresponding control information, for example, based on a transmit power of the network coded combined message 210-b, a distance to relay device 205, or the like. UE 115-c may also cache one or more other sidelink messages 210 (e.g., sidelink message 210-c) requesting network coding and may use the one or more other sidelink messages 210 with the network coded combined message 210-b to recover a missed sidelink message 210 (e.g., sidelink message 210-a).

UE 115-c may retrieve sidelink message information from the network coded combined message 210-b, which be based on retrieving partial information of the network coded combined message 210-b from one or more other sidelink messages 210 (e.g., sidelink message 210-c). For example, UE 115-c may have received and decoded the content of sidelink message 210-c (e.g., which is also included in network coded combined message 210-b) and may derive sidelink message 210-a from network coded combined message 210-b using the content of sidelink message 210-c (e.g., by extracting the content of sidelink message 210-a from network coded combined message 210-b based on identifying sidelink message 210-c). Similarly, UE 115-d may derive sidelink message 210-a from network coded combined message 210-b using the content of sidelink message 210-c (e.g., because UE 115-d transmitted sidelink message 210-c). UE 115-a may also derive sidelink message 210-c from network coded combined message 210-b using the content of sidelink message 210-a (e.g., because UE 115-a transmitted sidelink message 210-c).

As described herein, the control information for network coded combined message 210-b may indicate that the network coded combined message 210-b is a network coded retransmission of sidelink messages 210-a and 210-c, and may further include information identifying sidelink messages 210-a and 210-c and the corresponding UEs 115-a and 115-d that transmitted the sidelink messages 210. In some cases, the information identifying sidelink messages 210-a and 210-c may include a sequence number of the respective sidelink messages 210. The sequence number may represent a number of a sidelink message 210 within a sequence of sidelink messages 210 transmitted by a transmitting UE. The control information may also include an indication of a network coding algorithm used by relay device 205 to network code sidelink message 210-b. Some or all of the control information described herein may be included in a header of the network coded combined message 210-b.

The control information may support decoding of the network coded combined message 210-b. For example, UE 115-c may determine that the UE 115-c failed to receive or decode a sidelink message 210 (e.g., sidelink message 210-a) in a sequence of messages transmitted by a transmitting UE 115 (e.g., UE 115-a). UE 115-c may process the control information to determine whether the network coded combined message 210-b includes the missed sidelink message 210 (e.g., sidelink message 210-a). If the network coded combined message 210-b includes the missed sidelink message 210, UE 115-c may decode the network coded combined message 210-b. If the network coded combined message 210-b does not include the missed sidelink message 210, UE 115-c may skip decoding of the network coded combined message 210-b.

A network mechanism may be implemented in a MAC layer, a physical (PHY) layer, an RLC layer, a PDCP layer, or an upper layer (e.g., V2X layer or Application layer) of a protocol stack. The network coding mechanism may include indicating that the network coded combined message 210-*b* is a retransmission with network coding applied, may indicate a message identifier (ID) of the original sidelink messages 210 combined in the network coded combined message 210-*b*, and may indicate an algorithm used for the combination of the sidelink messages 210. When the network coding is implemented in a V2X layer or Application layer of the protocol stack, the indication that the network coded combined message 210-*b* is a network coded retransmission of sidelink messages 210-*a* and 210-*c* may be configured to be different in respective headers of different protocol layers (e.g., RLC, PDCP, or MAC layers). Examples of techniques for different protocol layers are described herein with reference to FIGS. 3-10, 12, and 13.

Figure 3:
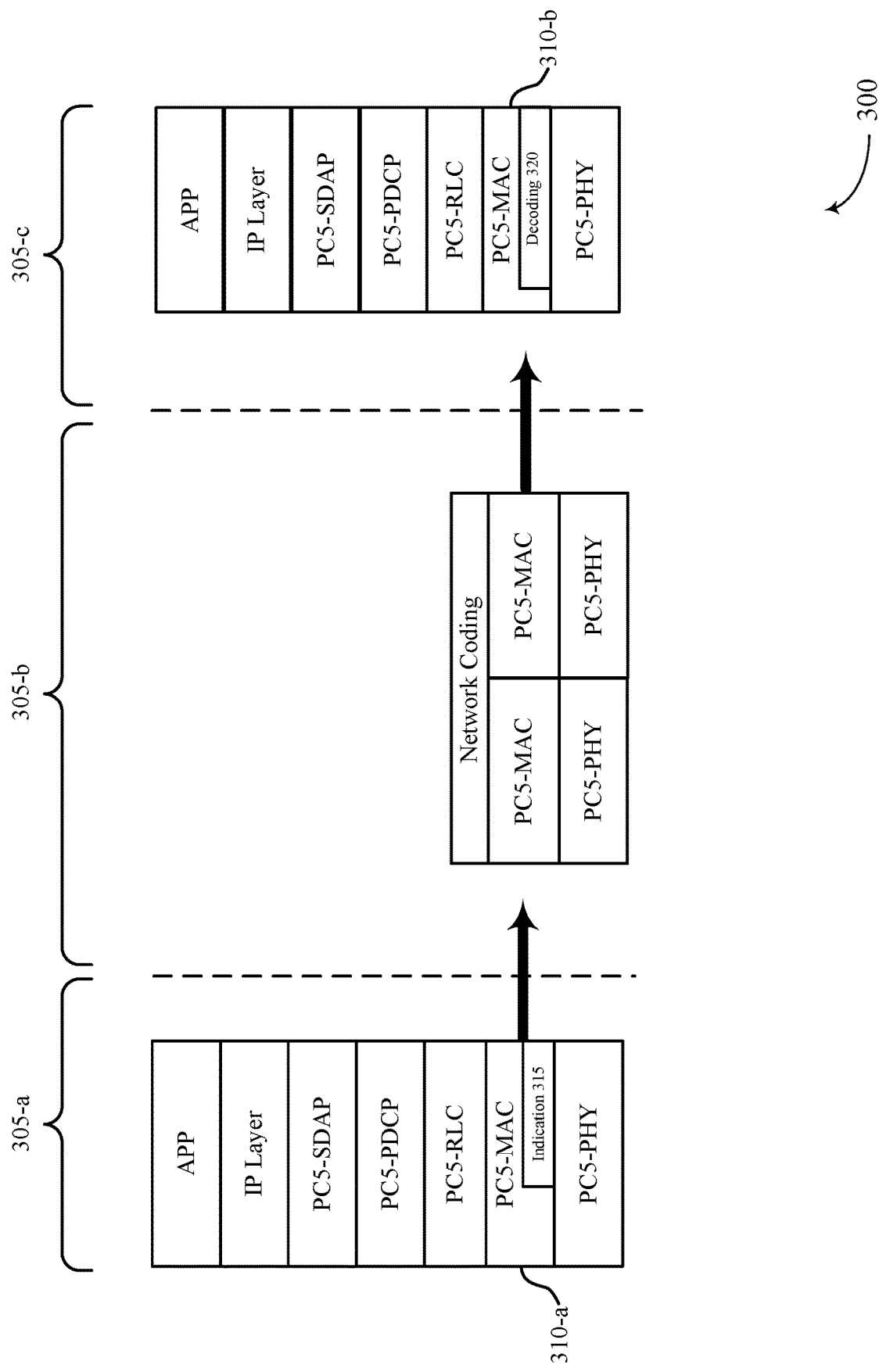
FIG. 3 illustrates an example of a protocol stack scheme in accordance with aspects of the present disclosure.

FIG. 3 illustrates an example of a protocol stack scheme 300 in accordance with aspects of the present disclosure. In some examples, protocol stack scheme 300 may implement or be implemented by aspects of wireless communications system 100 or 200. For example, protocol stack scheme 300 may be implemented by a transmitting UE 115, a receiving UE 115, and a relay device 205, where the first and receiving UEs 115 may represent respective examples of a UE 115 as described with reference to FIGS. 1 and 2 and the relay device 205 may represent an example of a relay device 205 described with reference to FIG. 2. Protocol stack scheme 300 may include a respective protocol stack 305 for the transmitting UE 115, the receiving UE 115, and the relay device 205, for example, where the respective protocol stacks 305 may be used for network coding a sidelink transmission.

FIG. 3 depicts protocol stacks 305 for connection-less network coding. In the depicted scheme, network coding may be performed at the PC5-MAC layer. For example, protocol stack 305-*a* may correspond to the transmitting UE 115, where the transmitting UE 115 may transmit a sidelink message that includes a request for network coding of a retransmission of the sidelink message. The transmitting UE 115 may stop, reduce, or minimize retransmissions (e.g., HARQ retransmissions) of the sidelink message, for example, based on the request for network coding the retransmission of the sidelink message. The transmitting UE 115 may also provide HARQ information to the relay device 205, for example indicating MAC PDUs that have been received or failed to be received by the receiving UE 115.

In some cases, the network coding may be activated at a MAC layer 310-*a* (e.g., a PC5-MAC layer) of protocol stack 305-*a*, or may be activated at a higher layer and implemented in the MAC layer 310-*a*. As such, the transmitting UE 115 may generate MAC protocol data units (PDUs) (e.g., sidelink message) that the transmitting UE 115 may include in an indication 315 within the MAC PDU, where the indication 315 may indicate that the MAC PDU (e.g., sidelink message) includes a request for network coding of a retransmission of the sidelink message.

As described with reference to FIG. 2, the transmitting UE 115 may transmit the sidelink message to the receiving UE 115 (e.g., as a groupcast or broadcast transmission), and in some cases, the receiving UE 115 may fail to receive or decode the sidelink message. The relay device 205 may receive the sidelink message and may determine that the sidelink message includes a request for network coding based on the indication 315 (e.g., at the MAC layer 310-*a*). The relay device 205 may determine to retransmit the sidelink message in a network coded combined message, for example, based on the indication 315 receiving UE. In some cases, the relay device 205 may determine to generate the network coded combined message based on feedback directed from the receiving UE 115 to the transmitting UE 115 (e.g., indicating a failure to decode the sidelink message). For example, the relay device 205 may receive feedback directed from the receiving UE 115 to the transmitting UE 115 and indicating that the receiving UE 115 failed to receive or decode the sidelink message. Accordingly, the relay device may determine to include the sidelink message in the network coded combined message (e.g., based on the failure to receive or decode the sidelink message) for retransmission.

Protocol stack 305-*b* may correspond to the relay device 205 and may represent an example of a protocol stack 305 for a network coded combined message. In some cases, the relay device 205 may perform the network coding for the combined sidelink message at or above the MAC layer 310. The relay device 205 may include control information in a sidelink control information (SCI) for the network coded combined message and, for example, in a subheader, a header, or both, of a MAC PDU of the network coded combined message. As described herein, the control information may include an indication that the network coded combined message includes multiple sidelink messages combined via network coding.

The control information may also include an indication identifying sidelink messages within the network coded combined message, for example, using a sequence number for the MAC PDU of the respective sidelink message. The control information may additionally or alternatively include an indication of a transmitting UE 115 for a respective sidelink message, as well as an indication of the network coding algorithm used for generating the network coded combined message.

The relay device 205 may transmit the network coded combined message (e.g., and corresponding control information) to the receiving UE 115 (e.g., in a groupcast or broadcast transmission). The relay device 205 may, for example, use the HARQ information received from the transmitting UE 115 to select one or more MAC PDUs to retransmit to the receiving UE 115 via the network coded combined message (e.g., may transmit missed MAC PDUs, or MAC PDUs that have not been decoded).

Protocol stack 305-*c* may correspond to the receiving UE 115 and may represent an example of a protocol stack 305 for decoding the network coded combined message. In some cases, the receiving UE 115 may perform decoding 320 for the combined sidelink message at or above the MAC layer 310. The receiving UE 115 may also receive the network coded combined message and may provide feedback (e.g., HARQ feedback) using one or more procedures configured for sidelink message feedback. For example, the receiving UE 115 may provide HARQ information (e.g., feedback) to the transmitting UE 115 (e.g., and also to the relay device) for each MAC PDU (e.g., may provide positive or negative feedback for each MAC PDU), whether received directly from the transmitting UE 115 or in the network coded combined message.

As described with reference to FIG. 2, the receiving UE 115 may perform decoding 320, such as using a network coding decoding function. The receiving UE 115 may apply the network coding decoding function to recover missed sidelink messages, such as the sidelink message from the transmitting UE 115.

Figure 4:
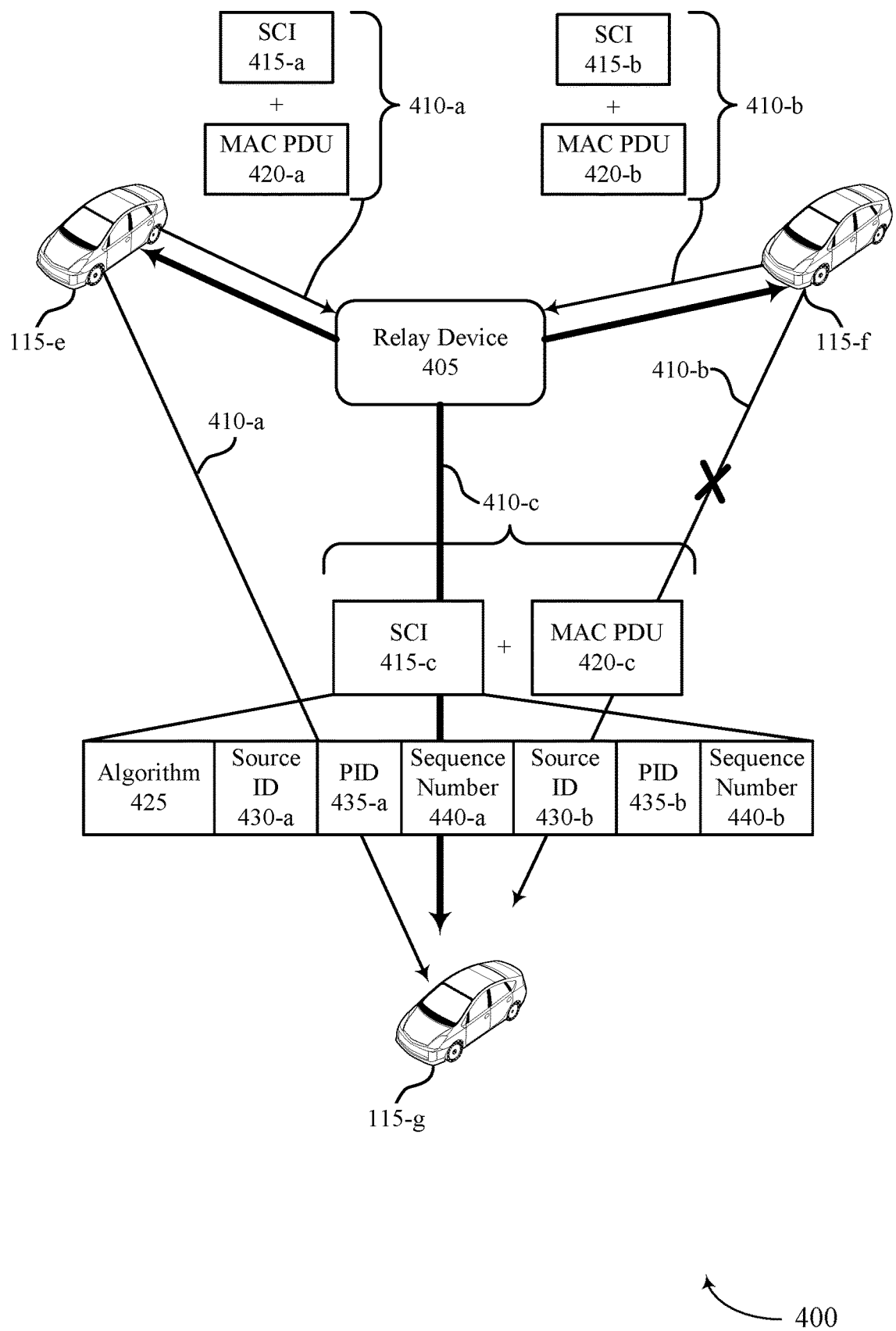
FIG. 4 illustrates an example of a signaling scheme in accordance with aspects of the present disclosure.

FIG. 4 illustrates an example of a signaling scheme 400 in accordance with aspects of the present disclosure. In some examples, signaling scheme 400 may implement or be implemented by aspects of wireless communications system 100 or 200. For example, signaling scheme 400 may be implemented by UEs 115-e, 115-f, and 115-g, as well as a relay device 405, where UEs 115-e, 115-f, and 115-g may represent respective examples of a UE 115 as described with reference to FIGS. 1-3 and the relay device 405 may represent an example of a relay device described with reference to FIGS. 2 and 3. Signaling scheme 400 may include respective sidelink messages 410 transmitted by UE 115-e, UE 115-f, and the relay device 405, for example, that may be used for network coding a sidelink message 410-c.

UEs 115-e and 115-f may transmit sidelink messages 410-a and 410-b, respectively, where UE 115-g may be an intended receiving UE 115 for one or both of sidelink messages 410-a and 410-b. In one example, one or both of sidelink messages 410-a and 410-b may fail to be received or decoded by UE 115-g (e.g., UE 115-g may fail to receive or decode sidelink message 410-b). Relay device 405 may also receive sidelink messages 410-a and 410-b to (e.g., in a broadcast or groupcast transmission from UEs 115-e and 115-f to receiving UE 115). Sidelink messages 410-a and 410-b may each include or correspond to a respective SCI 415 and a MAC PDU 420. The SCIs 415 may represent an example of an SCI-1 format, an SCI-2 format, a different format (e.g., a new format for including network coding information), or any combination thereof. As described herein, the SCIs 415 may include a network coding field or indication, where a network coding field set to a value (e.g., a value of '1') may indicate that the respective sidelink message 410 requests network coding for retransmission. While the examples described herein describe different UEs 115 transmitting sidelink messages 410-a and 410-b, the same techniques may be applied to sidelink messages 410-a and 410-b if transmitted from a single transmitting UE 115.

In one example, both an SCI 415-a and an SCI 415-b may indicate that the corresponding sidelink message 410 request network coding (e.g., via a network coding field set to a value of '1'). As such, relay device 405 may receive sidelink messages 410-a and 410-b and may cache or buffer sidelink messages 410-a and 410-b within a network coding time period (e.g., time window). For example, relay device 405 may receive sidelink messages 410-a and 410-b within a same time period for network coding and may cache or buffer sidelink messages 410-a and 410-b based on receiving the sidelink messages 410-a and 410-b within the time period. As described with reference to FIGS. 2 and 3, the relay device 405 may network code sidelink messages 410-a and 410-b to generate a network coded combined message 410-c, for example. The relay device may transmit the network coded combined message 410-c to any intended receiver UE 115 (e.g., a destination UE 115) for the corresponding sidelink messages 410-a and 410-b, such as UE 115-g (e.g., among other UEs 115).

The network coded combined message 410-c may be generated using an equation such as equation (1):

$$MSG3=NC(MSG1,MSG2) \quad (1)$$

where MSG3 may represent network coded combined message 410-c, NC may represent a network coding function or algorithm, MSG1 may represent sidelink message 410-a, and MSG2 may represent sidelink message 410-b. MSG3 may be included in the MAC PDU 420-c.

The network coded combined message 410-c may include or correspond to SCI 415-c, which may include network coding information (e.g., control information) that may support decoding of the network coded combined message 410-c at UE 115-g. The network coding information may include an indication of a network coding algorithm used for the network coded combined message 410-c, an indication of respective source IDs identifying the UEs 115 that transmitted sidelink messages 410-a and 410-b (e.g., a source ID 430-a identifying UE 115-e and a source ID 430-b identifying UE 115-f), indications of respective sidelink PIDs for HARQ information for sidelink messages 410-a and 410-b (e.g., a PID 435-a for sidelink message 410-a and a PID 435-b for sidelink message 410-b), and indication of respective sequence numbers 440 identifying sidelink messages 410-a and 410-b (e.g., a sequence number 440-a identifying sidelink message 410-a and a sequence number 440-b identifying sidelink message 410-b). The source IDs 430 and PIDs 435 may be obtained from the respective IDs from the SCIs 415-a and 415-b.

In some cases, MAC PDU 420-c may include a MAC subheader or header (e.g., a sidelink shared channel MAC subheader) that includes a sequence number 440 for each MAC PDU 420 combined into the network coded combined message 410-c. In some cases, the presence of the network coding information in SCI 415-c may indicate that the sidelink message 410-c (e.g., that MAC PDU 420-c) is a network coded retransmission of multiple sidelink MAC PDUs 420.

The SCI 415-c may additionally be configured with its own HARQ information, which may be used for one or more retransmissions of the network coded combined message 410-c (e.g., and SCI 415-c and MAC PDU 420-c). For example, if UE 115-g successfully decodes the network coded combined message 410-c, UE 115-g may indicate the corresponding HARQ PID in a positive feedback to the relay device 405 and/or to the transmitting UE 115-e or 115-f The relay device 405 may associate that HARQ PID with one or more of the HARQ PIDs of sidelink messages 410-a and/or 410-b, and may relay to the respective HARQ PIDs to the respective transmitting UE 115-e and/or 115-f, such that UE 115-e and/or 115-f may be aware that the corresponding sidelink message 410 was successfully received. Additionally, the relay device 405 (e.g., and a transmitting UE 115-e and/or 115-f) may determine to refrain from retransmitting the network coded combined message 410-c again (e.g., based on the positive feedback).

Negative feedback from UE 115-g may be relayed in a similar manner to the relay device 405 and/or the transmitting UE 115-e or 115-f, may determine to retransmit the network coded combined message 410-c or a corresponding sidelink message 410.

Figure 5:
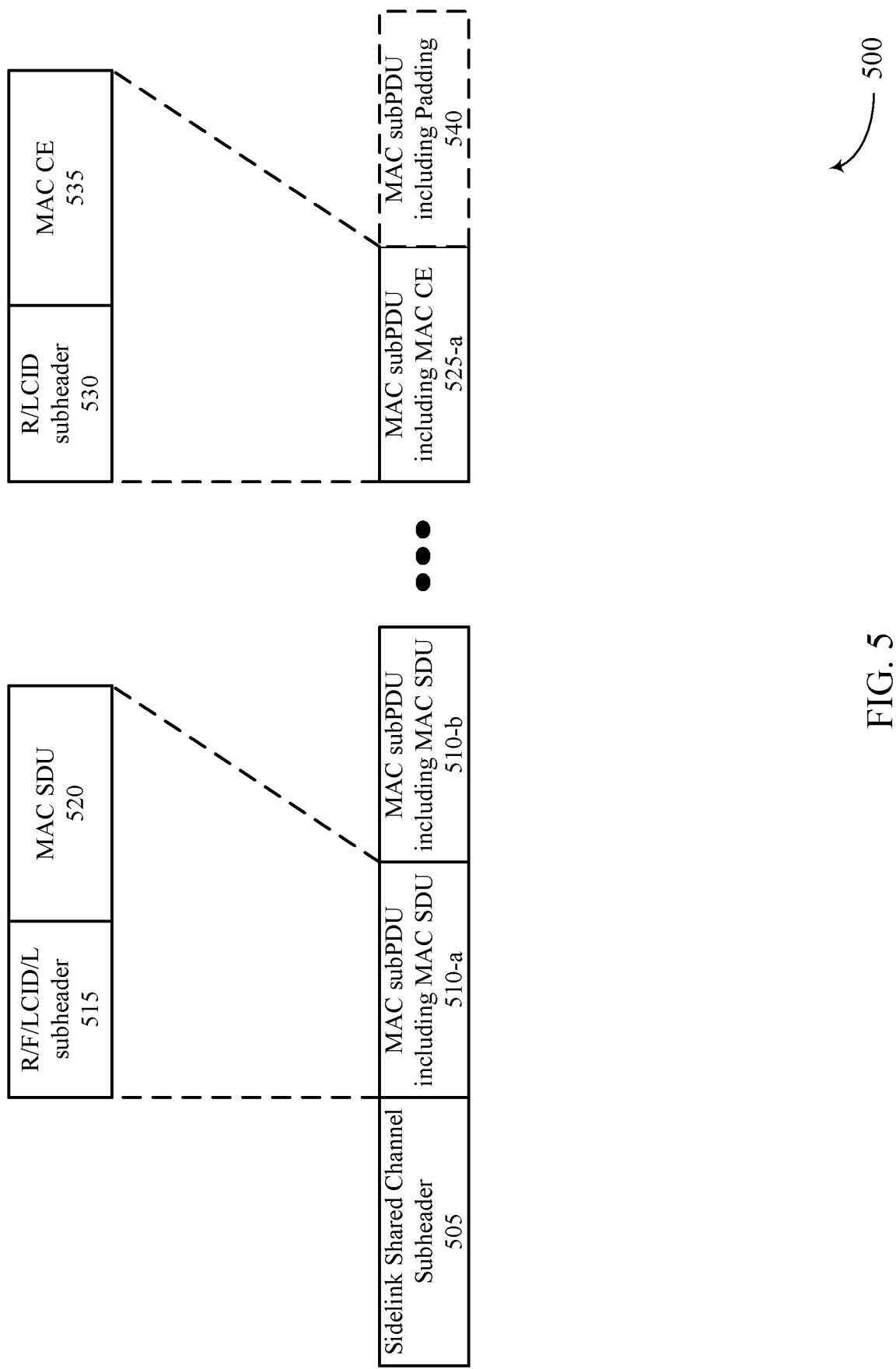
FIG. 5 illustrates an example of a header configuration in accordance with aspects of the present disclosure.

FIG. 5 illustrates an example of a subheader configuration 500 in accordance with aspects of the present disclosure. In some examples, subheader configuration 500 may implement or be implemented by aspects of wireless communications system 100 or 200. In some cases, subheader configuration 500 may also implement or be implemented by aspects of signaling scheme 400. Subheader configuration 500 may be implemented by one or more UEs 115 or a relay device 205, where the one or more UEs 115 may represent respective examples of a UE 115 as described with reference to FIGS. 1-4 and the relay device 205 may represent an example of a relay device 205 described with reference to FIGS. 2-4. For example, subheader configuration 500 may include one or more subheaders or headers may be included in a MAC PDU, as described with reference to FIG. 4 which may be used for network coding a sidelink message.

As described with reference to FIG. 4, sidelink messages that request network coding may each include a respective sequence number in a sidelink shared channel subheader 505 (e.g., a MAC PDU subheader). A relay device 205 (e.g., a relay UE 115) may use the respective sequence numbers from the sidelink messages as IDs to identify the sidelink messages in a network coded combined message that includes the sidelink messages. The sequence number may, for example, be included in network coding information in an SCI corresponding to or included in the network coded combined message (e.g., along with other information, including a respective PID for each sidelink message). A UE 115 receiving the network coded combined message may use the sequence numbers and network coding information (e.g., respective PIDs) indicated in the network coded combined message to identify which sidelink messages (e.g., MAC PDUs) are combined in the network coded combined message.

Subheader configuration 500 may represent, for example, a configuration for a MAC PDU (e.g., MAC PDU 420-*c*) included in or corresponding to the network coded combined message (e.g., combined message 410-*c*), which may then be used by the receiving UE 115 to determine corresponding sequence numbers for the sidelink messages of the network coded combined message. The MAC PDU may include the sidelink shared channel subheader (e.g., indicating the associated sequence number), and one or more MAC subPDUs 510. The one or more MAC subPDUs 510 may respectively be configured using (e.g., may include information for) a logical channel ID (LCID) subheader 515 and a MAC service data unit (SDU) 520. The MAC PDU may also include one or more MAC subPDUs 525 that may respectively be configured using (e.g., may include information for) an LCID subheader 530 and a MAC control element (CE) 535. In some cases, the MAC PDU may further include one or more MAC subPDUs 540 that may include one or more padding bits.

Figure 6:
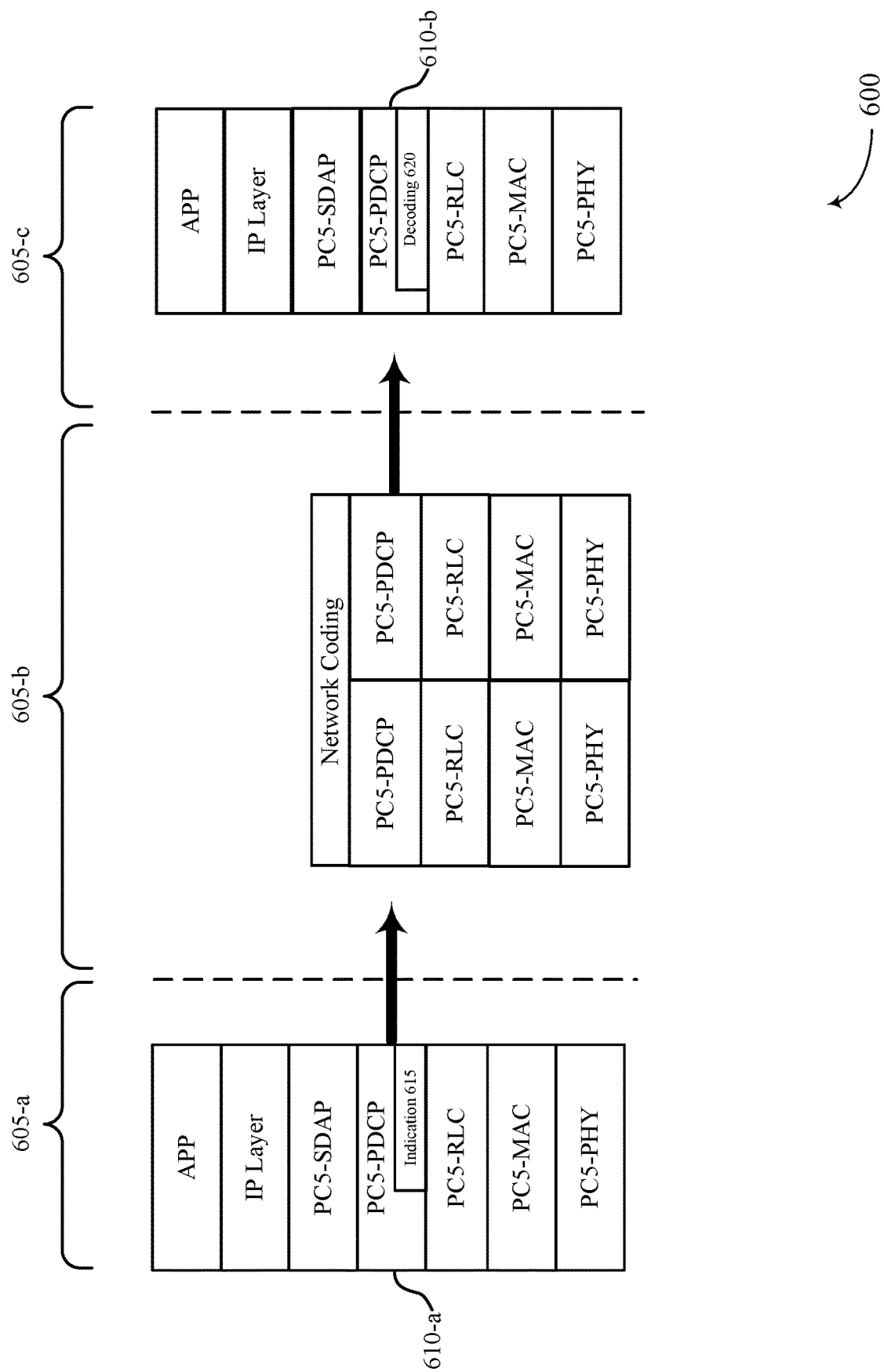
FIG. 6 illustrates an example of a protocol stack scheme in accordance with aspects of the present disclosure.

FIG. 6 illustrates an example of a protocol stack scheme 600 in accordance with aspects of the present disclosure. In some examples, protocol stack scheme 600 may implement or be implemented by aspects of wireless communications system 100 or 200. For example, protocol stack scheme 600 may be implemented by a transmitting UE 115, a receiving UE 115, and a relay device 205, where the first and receiving UEs 115 may represent respective examples of a UE 115 as described with reference to FIGS. 1-5 and the relay device 205 may represent an example of a relay device 205 described with reference to FIGS. 2-5. Protocol stack scheme 600 may include a respective protocol stack 605 for the transmitting UE 115, the receiving UE 115, and the relay device 205, for example, where the respective protocol stacks 605 may be used for network coding a sidelink transmission.

FIG. 6 depicts protocol stacks 605 for connection-less network coding. In the depicted scheme, network coding may be performed at the PC5-PDCP layer. For example, a protocol stack 605-*a* may correspond to the transmitting UE 115, where the transmitting UE 115 may transmit a sidelink message that may be configured for network coding (e.g., when network coding is activated by one or more upper layers in protocol stack 605-*a*). In some cases, the network coding may be activated at a PDCP layer 610-*a* (e.g., a PC5-PDCP layer) of protocol stack 605-*a*, or may be activated at a higher layer and implemented in the PDCP layer 610-*a*. As such, the transmitting UE 115 may indicate, within the PDCP layer 610-*a* (e.g., a PDCP PDU) of protocol stack 605-*a* that the sidelink message is configured for network coding. For example, the transmitting UE 115 may include an indication 615 within the PDCP PDU that the sidelink message is configured for network coding.

As described herein, the transmitting UE 115 may transmit the sidelink message to the receiving UE 115 (e.g., as a groupcast or broadcast transmission), and in some cases, the receiving UE 115 may fail to receive or decode the sidelink message. The relay device 205 may also receive the sidelink message and may determine that the sidelink message is configured for network coding based on the indication 615 (e.g., at the PDCP layer 610-*a*). The relay device 205 may determine to retransmit the sidelink message in a network coded combined message, for example, based on the indication 615 and based on the receiving UE 115 failing to receive or decode the sidelink message. As described herein, in some cases, the relay device 205 may determine to generate the network coded combined message based on feedback directed from the receiving UE 115 to the transmitting UE 115 (e.g., indicating a failure to decode the sidelink message).

A protocol stack 605-*b* may correspond to the relay device 205 and may represent an example of a protocol stack 605 for a network coded combined message. In some cases, the relay device 205 may perform the network coding for the combined sidelink message at or above the PDCP layer 610. The network coding may also be implemented with a relay function for relaying the sidelink message. The relay device 205 may include control information in SCI corresponding to the network coded combined message and, for example, in a header of a PDCP PDU of the network coded combined message. As described herein, the control information may include an indication that the network coded combined message includes multiple sidelink messages combined via network coding.

The control information may also include an indication identifying sidelink messages within the network coded combined message, for example, using a sequence number for the PDCP PDU of the respective sidelink message. The control information may additionally or alternatively include an indication of a transmitting UE 115 of a respective sidelink message, as well as an indication of the network coding algorithm used for the network coded combined message.

The relay device 205 may deliver PDCP PDUs to the upper layers of protocol stack 605-*b* using one or more configured procedures (e.g., using one or more configured procedures for non-network coded messages). The PDCP layer 610 of protocol stack 605-*b* may further store any PDCP SDUs configured for network coding for a time period or window for network coding (e.g., in a buffer), for example, after delivering the PDCP PDUs to the upper layers. The relay device 205 may transmit the network coded combined message (e.g., and corresponding control information) to the receiving UE 115 (e.g., in a groupcast or broadcast transmission). In some cases, the relay device 205 may indicate (e.g., via the network coded combined message or associated control information) a number of supported retransmissions of the network coded combined message (e.g., a number of configured retransmissions).

Protocol stack 605-*c* may correspond to the receiving UE 115 and may represent an example of a protocol stack 605 for decoding the network coded combined message. The receiving UE 115 may deliver PDCP PDUs to the upper layers of protocol stack 605-*c* using one or more configured procedures (e.g., using one or more configured procedures for non-network coded messages). The PDCP layer 610 of protocol stack 605-*c* may further store any PDCP SDUs configured for network coding for a time period or window for network coding (e.g., in a buffer), for example, after delivering the PDCP PDUs to the upper layers.

In some cases, the receiving UE 115 may perform decoding 620 for the combined sidelink message at or above the PDCP layer 610. The receiving UE 115 may also receive the network coded combined message and may perform feedback (e.g., HARQ feedback) using one or more procedures configured for sidelink message feedback. As described with reference to FIG. 2, the receiving UE 115 may perform decoding 620, such as using a network coding decoding function. The receiving UE 115 may apply the network coding decoding function to recover missed sidelink messages, such as the sidelink message from the transmitting UE 115.

Figure 7:
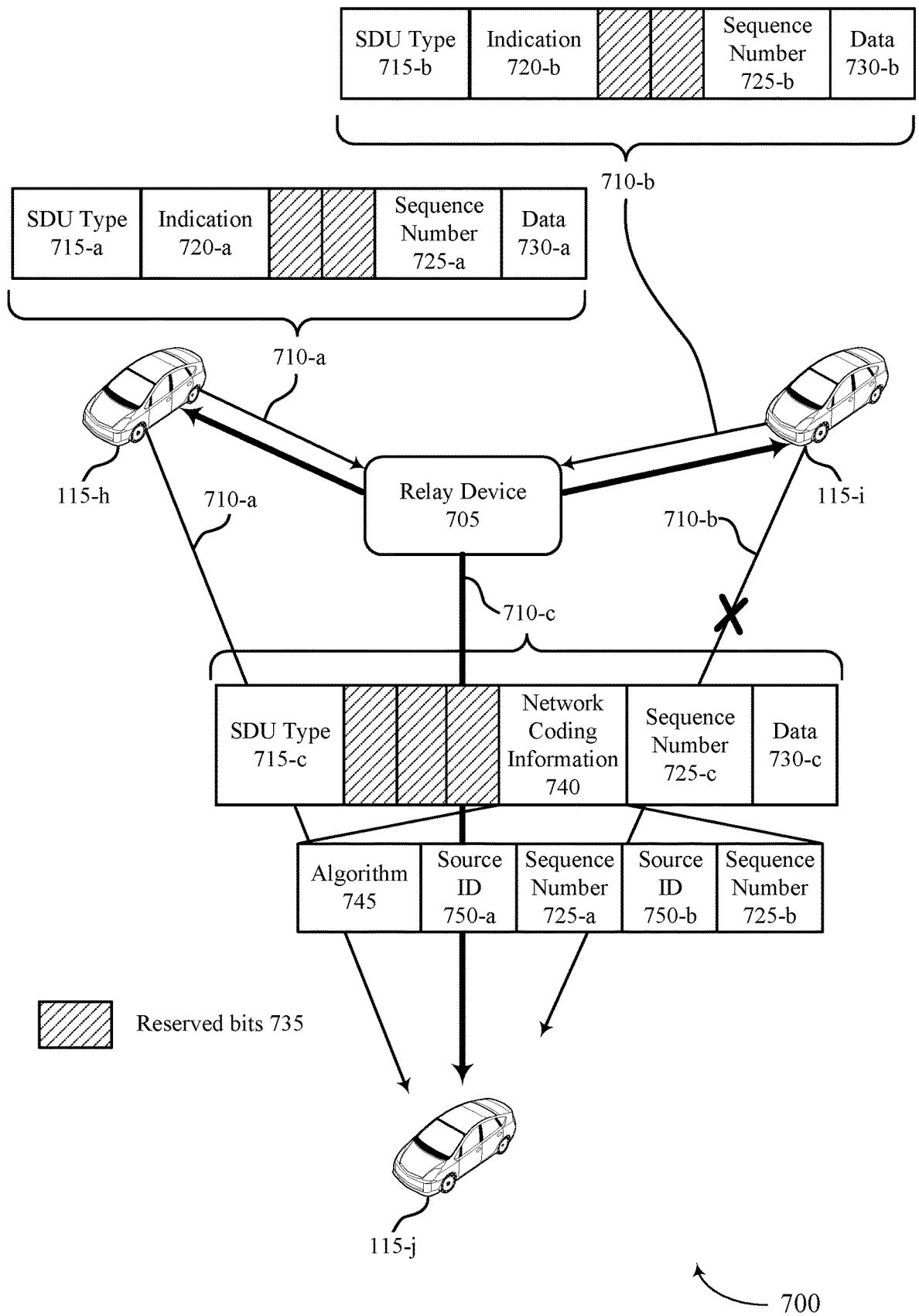
FIG. 7 illustrates an example of a signaling scheme in accordance with aspects of the present disclosure.

FIG. 7 illustrates an example of a signaling scheme 700 in accordance with aspects of the present disclosure. In some examples, signaling scheme 700 may implement or be implemented by aspects of wireless communications system 100 or 200. For example, signaling scheme 700 may be implemented by UEs 115-*h*, 115-*i*, and 115-*j*, as well as a relay device 705, where UEs 115-*h*, 115-*i*, and 115-*j* may represent respective examples of a UE 115 as described with reference to FIGS. 1-6 and the relay device 705 may represent an example of a relay device described with reference to FIGS. 2-6. Signaling scheme 700 may include respective sidelink messages 710 transmitted by UE 115-*h*, UE 115-*i*, and the relay device 705, for example, that may be used for network coding a sidelink message 710-*c*.

UEs 115-*h* and 115-*i* may transmit sidelink messages 710-*a* and 710-*b*, respectively, where UE 115-*j* may be an intended receiving UE 115 for one or both of sidelink messages 710-*a* and 710-*b*. In one example, one or both of sidelink messages 710-*a* and 710-*b* may fail to be received or decoded by UE 115-*j* (e.g., UE 115-*j* may fail to receive or decode sidelink message 710-*b*). UEs 115-*h* and 115-*i* may also transmit sidelink messages 710-*a* and 710-*b* to relay device 705 (e.g., in a broadcast or groupcast transmission). As described herein, each of sidelink messages 710-*a* and 710-*b* may include a network coding field or an indication 720, where a network coding field set to a value (e.g., a value of '1') may indicate that the respective sidelink message 710 is configured for network coding. While the examples described herein describe different UEs 115 transmitting sidelink messages 710-*a* and 710-*b*, the same techniques may be applied to sidelink messages 710-*a* and 710-*b* if transmitted from a same UE 115.

A sidelink message 710 may further include an indication of an SDU type 715 for the sidelink message 710, an indication of a sequence number 725 of the sidelink message 710, and data 730 for the sidelink message 710. A sequence number 725 may, for example, represent a sequence number for a PDCP. In some cases, the SDU type 715 may indicate whether the sidelink message 710 is a network coded combined message or not. For example, if an SDU type 715 of '1' is indicated, the sidelink message 710 may not be a network coded combined message, while if an SDU type 715 of '2' is indicated, the sidelink message 710 may be a network coded combined message. A sidelink message 710 may also include one or more reserved bits 735, where, for example, the indication 720 of a configuration for network coding (e.g., network coding field) may occupy or use one or more of the reserved bits 735.

In one example, both sidelink messages 710-*a* and 710-*b* may indicate that the corresponding sidelink message 710 is configured for network coding (e.g., via a network coding field or indication 720 set to a value of '1'). As such, relay device 705 may receive sidelink messages 710-*a* and 710-*b* and may cache or buffer sidelink messages 710-*a* and 710-*b* within a network coding time period (e.g., time window).

For example, relay device 705 may receive sidelink messages 710-*a* and 710-*b* within a same time period for network coding and may cache or buffer sidelink messages 710-*a* and 710-*b* based on receiving them within the time period. As described herein, the relay device 705 may network code sidelink messages 710-*a* and 710-*b* into a network coded combined message 710-*c*, for example, based on the respective indication that the sidelink messages 710 are configured for network coding. The relay device 705 may transmit the network coded combined message 710-*c* to any intended receiver UE 115 (e.g., destination UE 115) of the corresponding sidelink messages 710-*a* and 710-*b*, such as UE 115-*j* (e.g., among other UEs 115).

The network coded combined message 710-*c* may be generated using an equation such as equation (2):

$$MSG3=NC(MSG1,MSG2) \qquad (2)$$

where MSG3 may represent network coded combined message 710-*c*, NC may represent a network coding function or algorithm, MSG1 may represent sidelink message 710-*a*, and MSG2 may represent sidelink message 710-*b*. MSG3 may be included as the payload in data 730-*c*.

The network coded combined message 710-*c* may include network coding information 740 (e.g., control information) that may support decoding of the network coded combined message 710-*c* at UE 115-*j*. The network coding information 740 may include an indication of a network coding algorithm 745 used for the network coded combined message 710-*c*, an indication of respective source IDs 750 identifying the UEs 115 that transmitted sidelink messages 710-*a* and 710-*b* (e.g., a source ID 750-*a* identifying UE 115-*h* and a source ID 750-*b* identifying UE 115-*i*), and indication of respective sequence numbers 725 (e.g., PDCP sequence numbers) identifying sidelink messages 710-*a* and 710-*b* (e.g., a sequence number 725-*a* identifying sidelink message 710-*a* and a sequence number 725-*b* identifying sidelink message 710-*b*). A source ID 750 may represent one or more bits of an ID of the associated sidelink message 710. For example, the source ID 750 may include the sixteen most significant bits of a source layer-2 ID of a corresponding sidelink message 710. UE 115-*j* may use a respective source ID 750 and sequence number 725 (e.g., PDCP sequence number 725) to route the associated PDCP PDU(s) to the corresponding PDCP entity after decoding the network coded combined message 710-*c*.

The network coded combined message 710-*c* may also include an indication of an associated SDU type 715-*c* for the network coded combined message 710-*c*, as well as a sequence number 725-*c* and data 730-*c* for the network coded combined message 710-*c*. The SDU type 715-*c* may, for example, indicate an SDU type 715 of '2,' which may indicate that the network coded combined message 710-*c* is a network coded message that includes a retransmission. The data may represent a combination of data from data 730-*a* and data 730-*b* (e.g., from sidelink messages 710-*a* and 710-*b*, respectively). The network coded combined message 710-*c* may also include one or more reserved bits 735.

Figure 8:
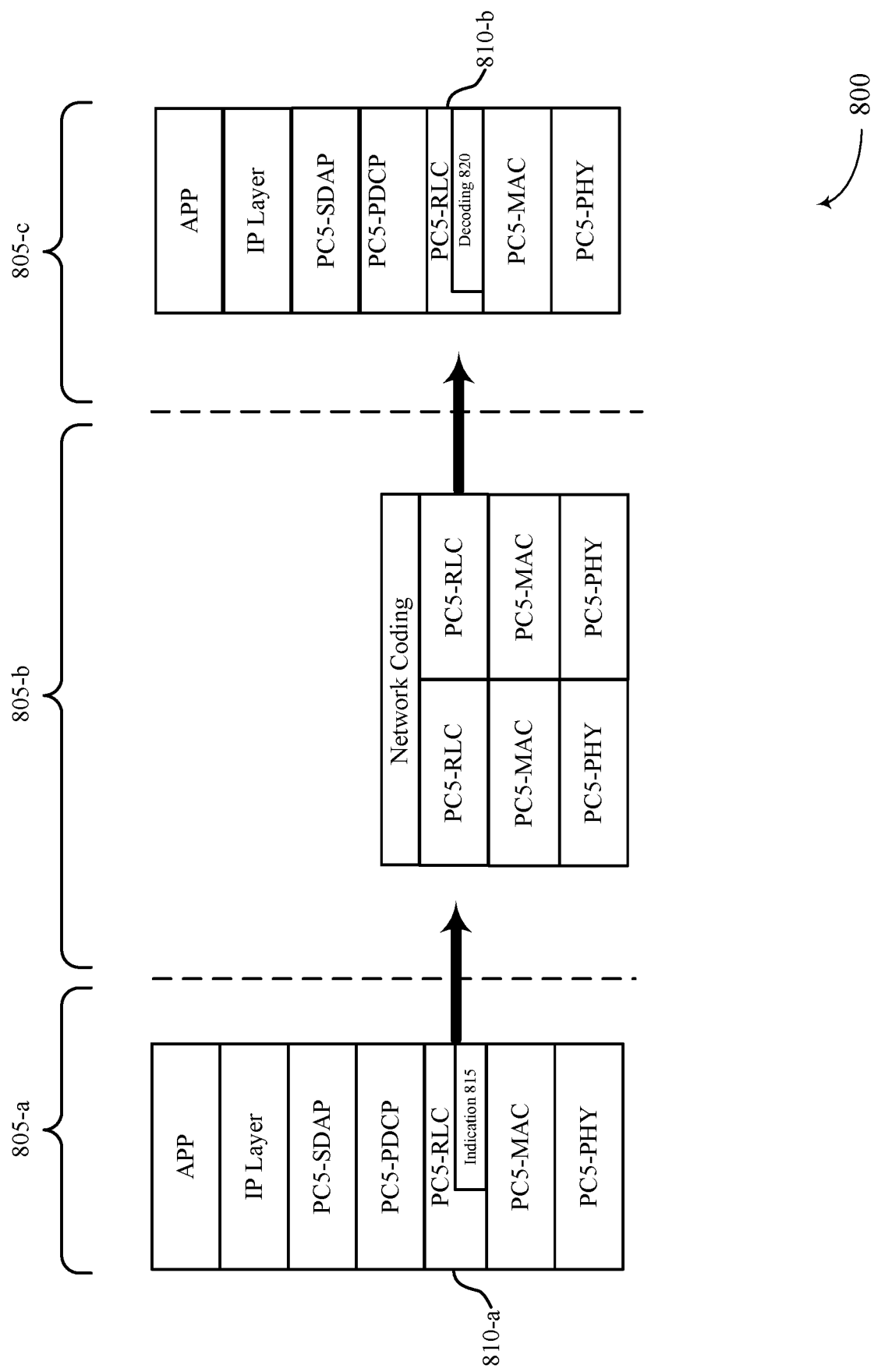
FIG. 8 illustrates an example of a protocol stack scheme in accordance with aspects of the present disclosure.

FIG. 8 illustrates an example of a protocol stack scheme 800 in accordance with aspects of the present disclosure. In some examples, protocol stack scheme 800 may implement aspects of wireless communications system 100 or 200. For example, protocol stack scheme 800 may be implemented by a transmitting UE 115, a receiving UE 115, and a relay device 205, where the first and receiving UEs 115 may represent respective examples of a UE 115 as described with reference to FIGS. 1-7 and the relay device 205 may represent an example of a relay device 205 described with reference to FIGS. 2-7. Protocol stack scheme 800 may include a respective protocol stack 805 for the transmitting UE 115, the receiving UE 115, and the relay device 205, for example, where the respective protocol stacks 805 may be used for network coding a sidelink transmission.

FIG. 8 depicts protocol stacks 805 for connection-less network coding. In the depicted scheme, network coding may be performed at the PC5-RLC layer. For example, protocol stack 805-a may correspond to the transmitting UE 115, where the transmitting UE 115 may transmit a sidelink message that may be configured for network coding (e.g., when network coding is activated by one or more upper layers in protocol stack 805-a). In some cases, the network coding may be activated at an RLC layer 810-a (e.g., a PC5-RLC layer) of protocol stack 805-a, or may be activated at a higher layer and implemented in the RLC layer 810-a. As such, the transmitting UE 115 may indicate, within an RLC layer 810-a (e.g., an RLC PDU) of protocol stack 805-a that the sidelink message is configured for network coding. For example, the transmitting UE 115 may include an indication 815 within the RLC PDU that the sidelink message is configured for network coding.

As described herein, the transmitting UE 115 may transmit the sidelink message to the receiving UE 115 (e.g., as a groupcast or broadcast transmission), and in some cases, the receiving UE 115 may fail to receive or decode the sidelink message. The relay device 205 may also receive the sidelink message and may determine that the sidelink message is configured for network coding based on the indication 815 (e.g., at the RLC layer 810-a). The relay device 205 may determine to retransmit the sidelink message in a network coded combined message, for example, based on the indication 815 and based on the receiving UE 115 failing to receive or decode the sidelink message. As described herein, in some cases, the relay device 205 may determine to generate the network coded combined message based on feedback directed from the receiving UE 115 to the transmitting UE 115 (e.g., indicating a failure to decode the sidelink message).

Protocol stack 805-b may correspond to the relay device 205 and may represent an example of a protocol stack 805 for a network coded combined message. In some cases, the relay device 205 may perform the network coding for the combined sidelink message at or above the RLC layer 810. The network coding may also be implemented with a relay function for relaying the sidelink message. The relay device 205 may include control information in SCI for the network coded combined message and, for example, in a header of an RLC PDU of the network coded combined message. As described herein, the control information may include an indication that the network coded combined message includes multiple sidelink messages combined via network coding.

The control information may also include an indication identifying sidelink messages within the network coded combined message, for example, using a sequence number for the RLC PDU of the respective sidelink message. The control information may additionally or alternatively include an indication of a transmitting UE 115 for a respective sidelink message, as well as an indication of the network coding algorithm used for the network coded combined message.

The relay device 205 may deliver RLC PDUs to the upper layers of protocol stack 805-b using one or more configured procedures (e.g., using one or more configured procedures for non-network coded messages). The RLC layer 810 of protocol stack 805-b may further store any RLC SDUs configured for network coding for a time period or window for network coding (e.g., in a buffer), for example, after delivering the RLC PDUs to the upper layers. The relay device 205 may transmit the network coded combined message (e.g., and corresponding control information) to the receiving UE 115 (e.g., in a groupcast or broadcast transmission). In some cases, the relay device 205 may indicate (e.g., via the network coded combined message or associated control information) a number of supported retransmissions of the network coded combined message (e.g., a number of configured retransmissions).

Protocol stack 805-c may correspond to the receiving UE 115 and may represent an example of a protocol stack 805 for decoding the network coded combined message. The receiving UE 115 may deliver RLC PDUs to the upper layers of protocol stack 805-c using one or more configured procedures (e.g., using one or more configured procedures for non-network coded messages). The RLC layer 810 of protocol stack 805-c may further store any RLC SDUs configured for network coding for a time period or window for network coding (e.g., in a buffer), for example, after delivering the RLC PDUs to the upper layers.

In some cases, the receiving UE 115 may perform decoding 820 for the combined sidelink message at or above the RLC layer 810. The receiving UE 115 may also receive the network coded combined message and may perform feedback (e.g., HARQ feedback) using one or more procedures configured for sidelink message feedback. As described with reference to FIG. 2, the receiving UE 115 may perform decoding 820, such as using a network coding decoding function. The receiving UE 115 may apply the network coding decoding function to recover missed sidelink messages, such as the sidelink message from the transmitting UE 115.

Figure 9:
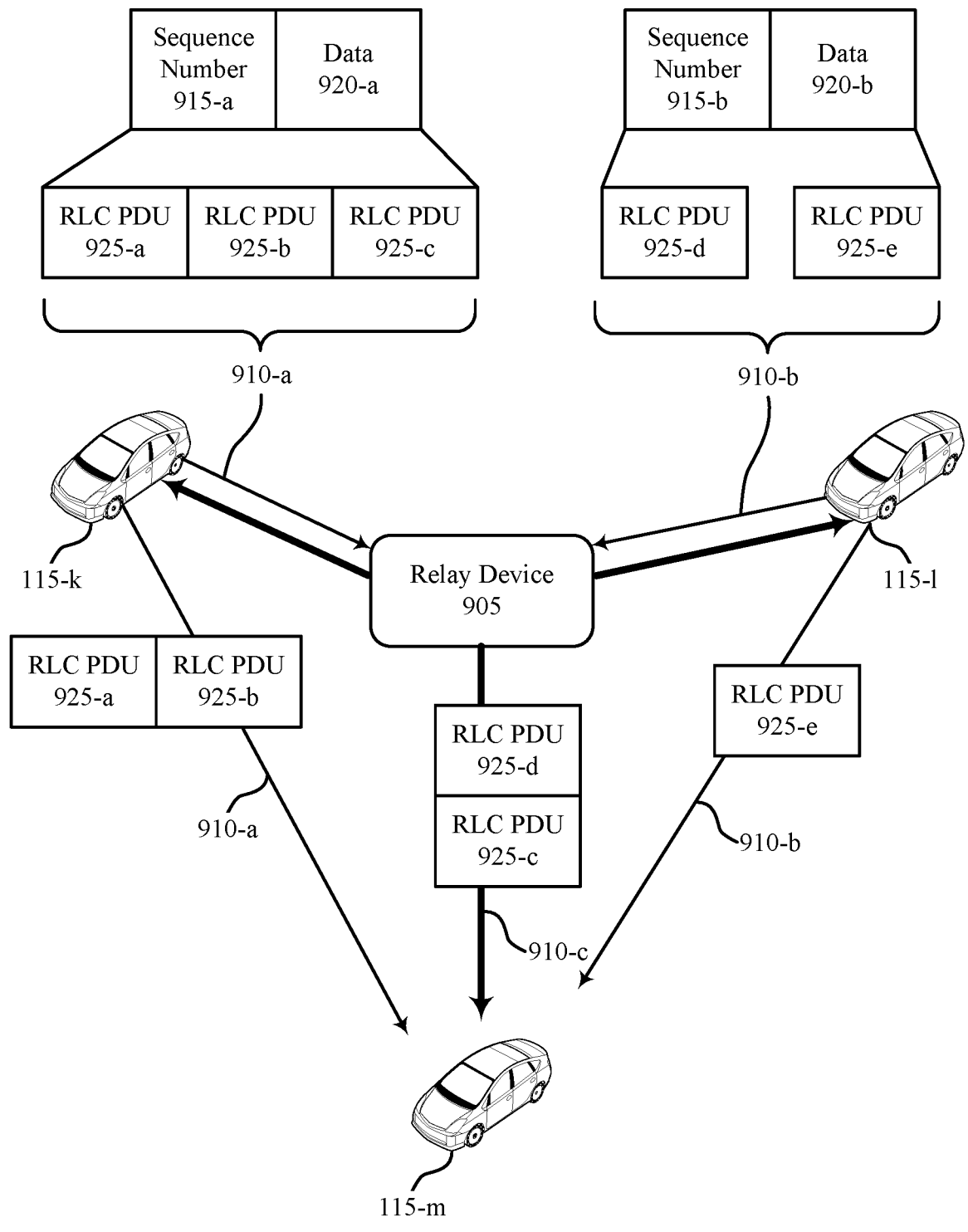
FIG. 9 illustrates an example of a signaling scheme in accordance with aspects of the present disclosure.

FIG. 9 illustrates an example of a signaling scheme 900 in accordance with aspects of the present disclosure. In some examples, signaling scheme 900 may implement aspects of wireless communications system 100 or 200. For example, signaling scheme 900 may be implemented by UEs 115-k, 115-l, and 115-m, as well as a relay device 905, where UEs 115-k, 115-l, and 115-m may represent respective examples of a UE 115 as described with reference to FIGS. 1-8 and the relay device 905 may represent an example of a relay device described with reference to FIGS. 2-8. Signaling scheme 900 may include respective sidelink messages 910 transmitted by UE 115-k, UE 115-l, and the relay device 905, for example, that may be used for network coding a sidelink message 910-c.

UEs 115-k and 115-l may transmit sidelink messages 910-a and 910-b, respectively, where UE 115-m may be an intended receiving UE 115 for one or both of sidelink messages 910-a and 910-b. In one example, one or both of sidelink messages 910-a and 910-b may fail to be completely received or decoded by UE 115-m (e.g., UE 115-m may fail to receive or decode sidelink message 910-b). Each sidelink message 910 may have a corresponding sequence number 915 and data 920, and may include one or more RLC PDUs 925 corresponding to the sequence number 915 and to a segment number for the respective RLC PDU 925.

In some cases, a PDCP SDU may be segmented into multiple RLC PDUs 925, and each RLC PDU 925 (e.g., a segment of a PDCP SDU) may be assigned a segment number within a respective sidelink message 910, such that the RLC PDU 925 may be identified by the corresponding segment number and the sequence number 915 for the sidelink message 910. For example, a PDCP sequence number 915-a (e.g., sequence number A) and data 920-a may include RLC PDUs 925-a, 925-b, and 928-c and a PDCP sequence number 915-b (e.g., sequence number B) and data 920-b may include RLC PDUs 925-d and 925-e.

The RLC PDUs 925 corresponding to PDCP sequence number 915-a may be assigned a same RLC sequence number 915 (e.g., sequence number X), and may each be individually assigned a different segment number. For example, RLC PDU 925-a may be assigned a segment number 1, RLC PDU 925-b may be assigned a segment number 2, and RLC PDU 925-c may be assigned a segment number 3. Similarly, the RLC PDUs 925 corresponding to PDCP sequence number 915-b may be assigned a same RLC sequence number 915 (e.g., sequence number Y), and may each be individually assigned a different segment number. For example, RLC PDU 925-d may be assigned a segment number 1 and RLC PDU 925-e may be assigned a segment number 2.

UEs 115-k and 115-l may also transmit sidelink messages 910-a and 910-b to relay device 905 (e.g., in a broadcast or groupcast transmission). While the examples described herein describe different UEs 115 transmitting sidelink messages 910-a and 910-b, the same techniques may be applied to sidelink messages 910-a and 910-b if transmitted from a same UE 115.

UE 115-m may receive a first portion of the RLC PDUs 925 of sidelink message 910-a and sidelink message 910-b and may fail to receive a second portion of the RLC PDUs 925 of sidelink message 910-a and sidelink message 910-b. For example, UE 115-m may receive or decode RLC PDUs 925-a and 925-b (e.g., corresponding respectively to sequence number X, segment number 1 and sequence number X, segment number 2) from sidelink message 910-a and may fail to receive or decode RLC PDU 925-c (e.g., corresponding to sequence number X, segment number 3) from sidelink message 910-a. Similarly, UE 115-m may receive or decode RLC PDU 925-e (e.g., corresponding respectively to sequence number Y, segment number 2) from sidelink message 910-b and may fail to receive or decode RLC PDU 925-d (e.g., corresponding respectively to sequence number Y, segment number 1) from sidelink message 910-b.

As described herein, the relay device 905 may network code sidelink messages 910-a and 910-b into a network coded combined message 910-c, for example, based on a respective indication that the sidelink messages 910 are configured for network coding. The relay device 905 may transmit the network coded combined message 910-c to any intended receiver UE 115 (e.g., destination UE 115) for the corresponding sidelink messages 910-a and 910-b, such as UE 115-m (e.g., among other UEs 115).

An RLC PDU 925 for the network coded combined message 910-c may be generated using an equation such as equation (3):

NC RLC PDU=NC(RLC PDU(SNX,SEG #2),RCL PDU(SNX,SEG #3)) (3)

where NC RLC PDU may represent an RLC PDU 925 of the network coded combined message 910-c, NC may represent a network coding function or algorithm, RLC PDU(SNX, SEG #2) may represent an RLC PDU 925 corresponding to sequence number X and segment number 2 (e.g., corresponding to RLC PDU 925-b), and RLC PDU(SNX, SEG #3) may represent an RLC PDU 925 corresponding to sequence number X and segment number 3 (e.g., corresponding to RLC PDU 925-c).

Additionally or alternatively, an RLC PDU 925 for the network coded combined message 910-c may be generated using an equation such as equation (4):

NC RLC PDU=NC(RLC PDU(SNX,SEG #2),RCL PDU(SNX,SEG #3)) (4)

where NC RLC PDU may represent an RLC PDU 925 of the network coded combined message 910-c, NC may represent a network coding function or algorithm, RLC PDU(SNX, SEG #2) may represent an RLC PDU 925 corresponding to sequence number X and segment number 2 (e.g., corresponding to RLC PDU 925-b), and RLC PDU(SNY, SEG #1) may represent an RLC PDU 925 corresponding to sequence number Y and segment number 1 (e.g., corresponding to RLC PDU 925-d).

In one example, the relay device 905 may combine portions of the sidelink messages 910-a and 910-b that UE 115-m failed to receive or decode. For example, relay device 905 may determine that UE 115-m failed to receive or decode RLC PDUs 925-c and 925-d (e.g., based on corresponding feedback transmitted from UE 115-m to UE 115-k and/or UE 115-l). Relay device 905 may therefore combine RLC PDUs 925-c and 925-d into the network coded combined message 910-c (e.g., without combining or including other RLC PDUs 925 from the associated sidelink messages 910).

The network coded combined message 910-c may include network coding information (e.g., control information) as described herein, which may support decoding of the network coded combined message 910-c at UE 115-m. For example, the network coding information may include an indication of a network coding algorithm used for the network coded combined message 910-c, an indication of respective source IDs identifying the UEs 115 that transmitted sidelink messages 910-a and 910-b, and an indication of respective sequence numbers 955 (e.g., RLC sequence numbers) identifying sidelink messages 910-a and 910-b.

UE 115-m may use a respective source ID and sequence number 915 (e.g., RLC sequence number 915) to route the associated RLC PDU(s) to the corresponding RLC entity after decoding the network coded combined message 910-c. UE 115-m may use the network coded combined message 910-c to recover information or data (e.g., RLC PDUs 925) missed from sidelink messages 910-a and 910-b (e.g., as described with reference to FIG. 2).

Figure 10:
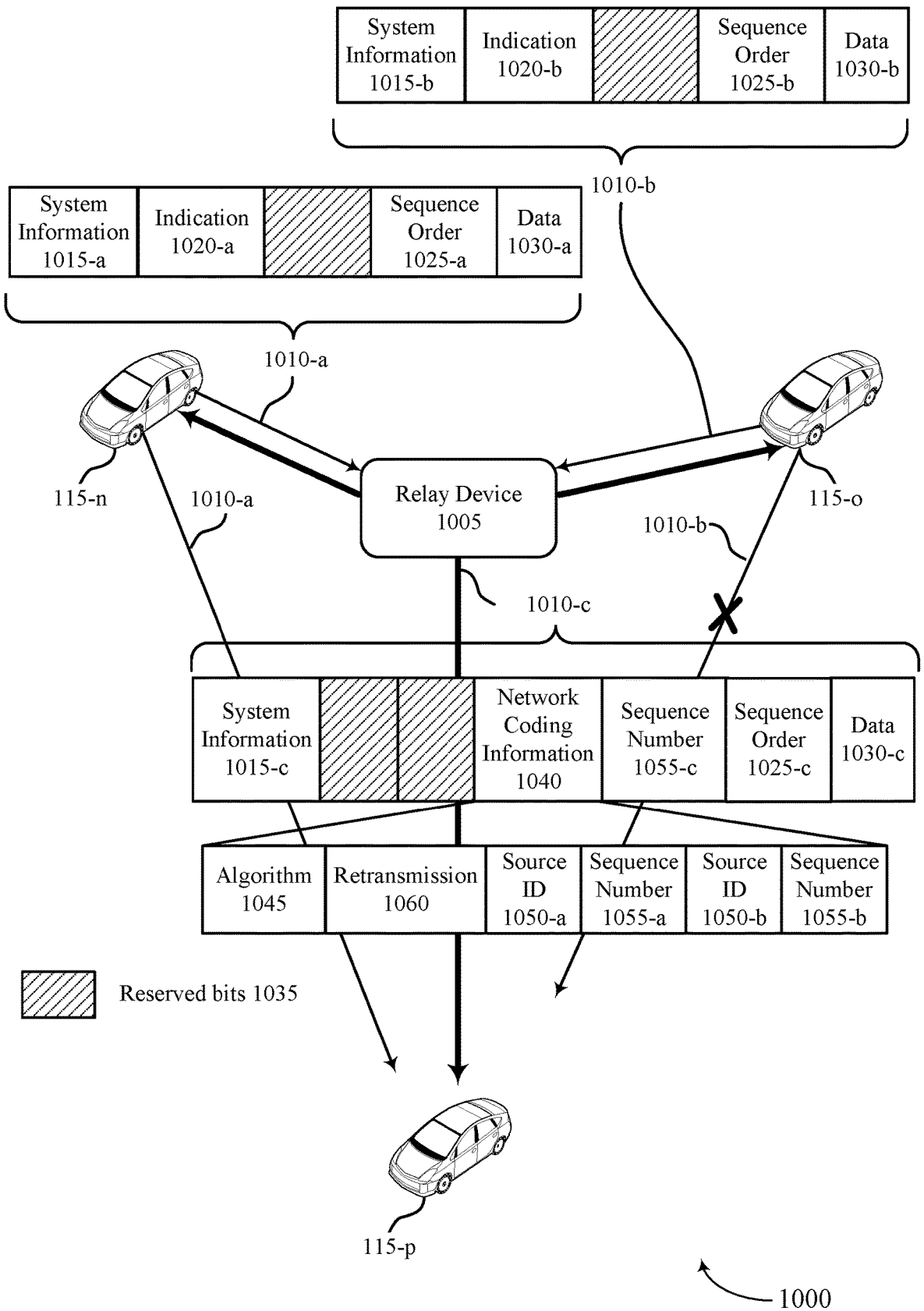
FIG. 10 illustrates an example of a signaling scheme in accordance with aspects of the present disclosure.

FIG. 10 illustrates an example of a signaling scheme 1000 in accordance with aspects of the present disclosure. In some examples, signaling scheme 1000 may implement aspects of wireless communications system 100 or 200. For example, signaling scheme 1000 may be implemented by UEs 115-n, 115-o, and 115-p, as well as a relay device 1005, where UEs 115-n, 115-o, and 115-p may represent respective examples of a UE 115 as described with reference to FIGS. 1-9 and the relay device 1005 may represent an example of a relay device described with reference to FIGS. 2-9. Signaling scheme 1000 may include respective sidelink messages 1010 transmitted by UE 115-n, UE 115-o, and the relay device 1005, for example, that may be used for network coding a sidelink message 1010-c.

UEs 115-n and 115-o may transmit sidelink messages 1010-a and 1010-b, respectively, where UE 115-p may be an intended receiving UE 115 for one or both of sidelink messages 1010-a and 1010-b. In one example, one or both of sidelink messages 1010-a and 1010-b may fail to be received or decoded by UE 115-p (e.g., UE 115-p may fail to receive or decode sidelink message 1010-b). UEs 115-n and 115-o may also transmit sidelink messages 1010-a and 1010-*b* to relay device 1005 (e.g., in a broadcast or groupcast transmission). As described herein, each of sidelink messages 1010-*a* and 1010-*b* may include a network coding field or indication 1020, where a network coding field set to a value (e.g., a value of '1') may indicate that the respective sidelink message 1010 is configured for network coding. While the examples described herein describe different UEs 115 transmitting sidelink messages 1010-*a* and 1010-*b*, the same techniques may be applied to sidelink messages 1010-*a* and 1010-*b* if transmitted from a same UE 115.

A sidelink message 1010 (e.g., an RLC PDU) may further include system information 1015 for the sidelink message 1010, an indication of a sequence order 1025 of the sidelink message 1010, and data 1030 for the sidelink message 1010. A sequence order 1025 may, for example, represent an order of sequence numbers for respective RLC PDUs. A sidelink message 1010 may also include one or more reserved bits 1035, where, for example, the indication 1020 of a configuration for network coding (e.g., network coding field) may occupy or use one or more of the reserved bits 1035.

In one example, both sidelink messages 1010-*a* and 1010-*b* may indicate that the corresponding sidelink message 1010 is configured for network coding (e.g., via a network coding field or indication 1020 set to a value of '1'). As such, relay device 1005 may receive sidelink messages 1010-*a* and 1010-*b* (e.g., without network coding information and including the indication 1020) and may cache or buffer sidelink messages 1010-*a* and 1010-*b* within a network coding time period (e.g., time window). For example, relay device 1005 may receive sidelink messages 1010-*a* and 1010-*b* within a same time period for network coding and may cache or buffer sidelink messages 1010-*a* and 1010-*b* based on receiving them within the time period.

As described herein, the relay device 1005 may network code sidelink messages 1010-*a* and 1010-*b* into a network coded combined message 1010-*c*, for example, based on the respective indication 1020 that the sidelink messages 1010 are configured for network coding. The relay device 1005 may transmit the network coded combined message 1010-*c* to any intended receiver UE 115 (e.g., destination UE 115) for the corresponding sidelink messages 1010-*a* and 1010-*b*, such as UE 115-*p* (e.g., among other UEs 115). The network coded combined message 1010-*c* may be generated using an equation such as equation (5):

$$MSG3 = NC(MSG1, MSG2) \quad (5)$$

where MSG3 may represent network coded combined message 1010-*c*, NC may represent a network coding function or algorithm, MSG1 may represent sidelink message 1010-*a*, and MSG2 may represent sidelink message 1010-*b*. MSG3 may be the payload of data 1030-*c*.

The network coded combined message 1010-*c* may include network coding information 1040 (e.g., control information) that may support decoding of the network coded combined message 1010-*c* at UE 115-*p*. The network coding information 1040 may include an indication of a network coding algorithm 1045 used for the network coded combined message 1010-*c*, an indication of respective source IDs 1050 identifying the UEs 115 that transmitted sidelink messages 1010-*a* and 1010-*b* (e.g., a source ID 1050-*a* identifying UE 115-*n* and a source ID 1050-*b* identifying UE 115-*o*), and indication of respective sequence numbers 1055 (e.g., RLC sequence numbers) identifying sidelink messages 1010-*a* and 1010-*b* (e.g., a sequence number 1055-*a* identifying sidelink message 1010-*a* and a sequence number 1055-*b* identifying sidelink message 1010-*b*). A source ID 1050 may represent one or more bits of an ID of the associated sidelink message 1010. For example, the source ID 1050 may include the sixteen most significant bits of a source layer-2 ID of a corresponding sidelink message 1010.

A sequence number 1055 may be included in a sidelink message 1010 (e.g., sidelink message 1010-*a*, 1010-*b*, and/or 1010-*c*), for example, even when corresponding PDUs are not segmented in an unacknowledged mode (UM) (e.g., RLC PDUs are not segmented, or include a complete, non-segmented RLC SDU). An RLC sequence number 1055 may be increased by a value of one for each RLC PDU. A sequence number 1055 may also be included in a MAC PDU for a sidelink message 1010 (e.g., sidelink message 1010-*a*, 1010-*b*, and/or 1010-*c*), for example, to support feedback (e.g., HARQ feedback) provided by the MAC layer. For example, the MAC layer may provide a feedback report to the RLC layer, which may indicate a maximum number of retransmissions. Such feedback may be used to determine (e.g., at the relay device 1005) which RLC PDUs to combine for the network coded combined message 1010-*c*.

UE 115-*p* may use a respective source ID 1050 and sequence number 1055 (e.g., RLC sequence number 1055) to route the associated RLC PDU(s) to the corresponding RLC entity after decoding the network coded combined message 1010-*c*. The network coding information 1040 may also include an indication of a retransmission 1060, where UE 115-*p* may also identify the network coded combined message 1010-*c* as a network coded message based on the indication of the retransmission 1060. UE 115-*p* may accordingly cache or buffer the network coded combined message 1010-*c* based on the indication of the retransmission 1060.

The network coded combined message 1010-*c* may also include an indication of associated system information 1015-*c* for the network coded combined message 1010-*c*, as well as a sequence number 1055-*c*, a sequence order 1025-*c*, and data 1030-*c* for the network coded combined message 1010-*c*. The data 1030-*c* may represent a combination of data from sidelink data 1030-*a* and data 1030-*b* (e.g., from sidelink messages 1010-*a* and 1010-*b*, respectively), for example, as represented by equation (5). UE 115-*p* may use a source ID 1050 and a sequence number 1055 (e.g., an RLC sequence number 1055) indicated in the network coding information 1040 to reassemble a corresponding RLC PDU. UE 115-*p* may, for example, use respective source IDs 1050 and sequence numbers 1055 to reassemble each of the RLC PDUs included in the network coded combined message 1010-*c*.

The network coded combined message 1010-*c* may also include one or more reserved bits 1035, which may, for example, be used to indicate that the network coded combined message 1010-*c* is a network coded retransmission. For example, if a reserved bit 1035 has a value of '1' and the network coding information 1040 includes an indication of a retransmission 1060, UE 115-*p* may determine that an RLC PDU of the network coded combined message 1010-*c* is a network coded retransmitted PDU.

Figure 11:
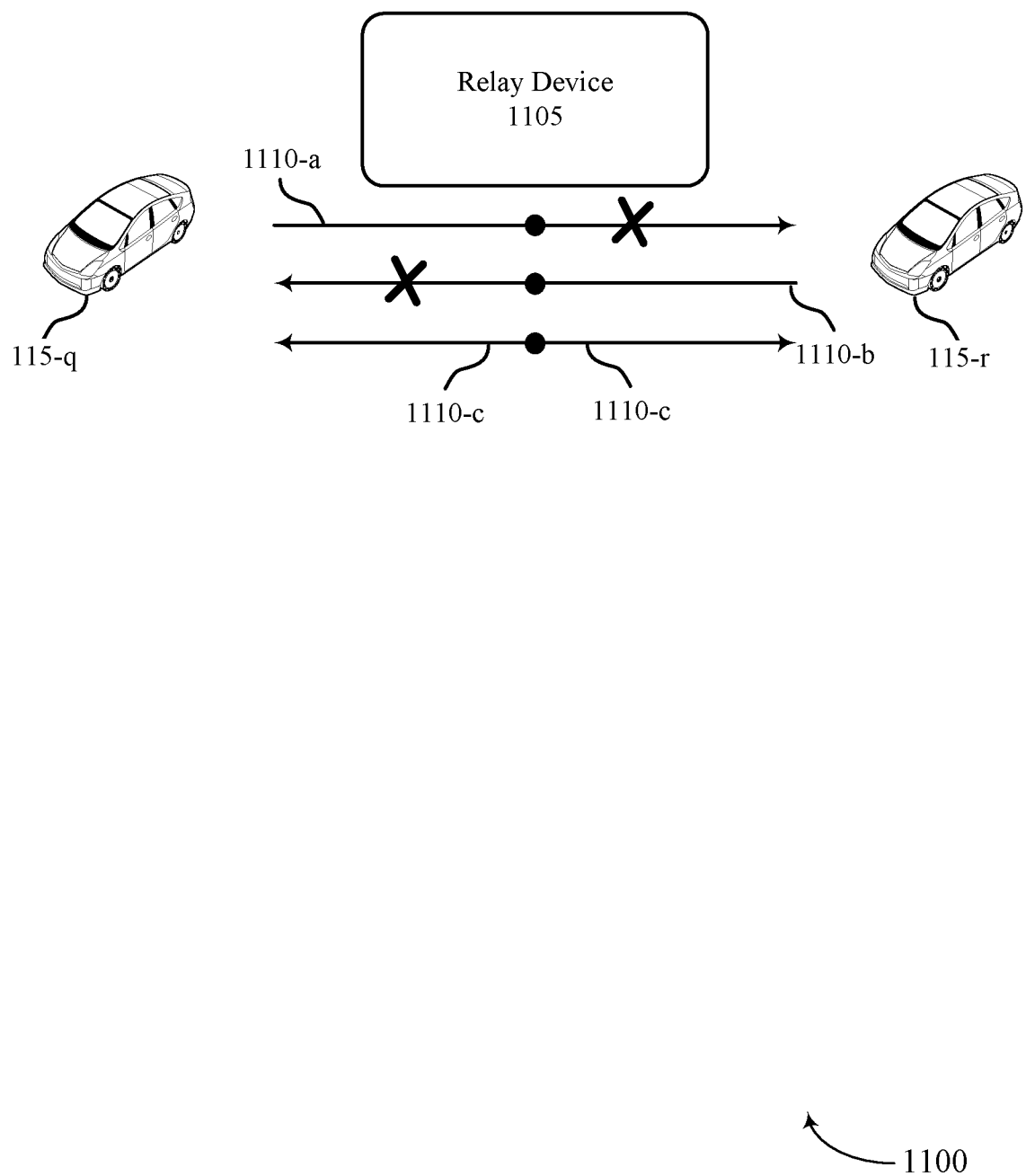
FIG. 11 illustrates an example of a signaling scheme in accordance with aspects of the present disclosure.

FIG. 11 illustrates an example of a signaling scheme 1100 in accordance with aspects of the present disclosure. In some examples, signaling scheme 1100 may implement aspects of wireless communications system 100 or 200. For example, signaling scheme 1100 may be implemented by UEs 115-*q* and 115-*r*, as well as a relay device 1105, where UEs 115-*q* and 115-*r* may represent respective examples of a UE 115 as described with reference to FIGS. 1-10 and the relay device 1105 may represent an example of a relay device described with reference to FIGS. 2-10. Signaling scheme 1100 may include respective sidelink messages 1110 transmitted by UEs 115-*q* and 115-*r*, and the relay device 1105, for example, that may be used for network coding a sidelink message 1110-*c*.

The UEs 115 may communicate with one another by transmitting broadcast or unicast sidelink messages 1110. For example, UE 115-*q* may transmit a sidelink message 1110-*a* to UE 115-*r*, and, in some cases, may transmit sidelink message 1110-*a* to UE 115-*r* using one or more relay techniques (e.g., if UE 115-*r* is not available for a direct transmission). Similarly, UE 115-*r* may transmit a sidelink message 1110-*b* to UE 115-*q*, which may also be transmitted using the one or more relay techniques. In some cases, the one or more relay techniques may be referred to as layer 2 (L2) UE-to-UE relaying. When using the one or more relay techniques to communicate between UE 115-*q* and UE 115-*r*, UEs 115-*q* and 115-*r* may respectively establish a link (e.g., a PC5 unicast link) with relay device 1105 for relaying data (e.g., unicast data relaying at L2).

The relay device 1105 may receive sidelink messages 1110-*a* and 1110-*b* from UEs 115-*q* and 115-*r*, respectively (e.g., for relaying sidelink messages 1110-*a* and 1110-*b*). The relay device 1105 may additionally support network coding for sidelink messages 1110-*a* and 1110-*b*, and may, for example, perform relaying procedures in coordination with network coding. For example, relay device 1105 may cache sidelink messages 1110 received from UE 115-*q*, UE 115-*r*, or both (e.g., among other UEs 115), and may forward or relay the sidelink messages 1110 to the other UE 115. Relay device 1105 may also combine sidelink message 1110-*a* or 1110-*b*, or both, for a network coded combined message 1110-*c* (e.g., based on UE 115-*r* and/or UE 115-*q* failing to receive or decode a respective sidelink message 1110). Such network coding may be for retransmission of sidelink message 1110-*a* or 1110-*b*, or both, and may be referred to as connection-based network coding. The network coding may be based on feedback (e.g., HARQ feedback) from UE 115-*q* or 115-*r*, or both.

In such cases, network coding the sidelink message 1110-*c* may include combining sidelink messages 1110 from multiple HARQ PIDs or multiple UEs 115 to a same destination UE 115 (e.g., a remote UE 115). In some cases, the network coded combined message 1110-*c* may be a network coded retransmission that is unicast to a remote UE 115 or that is broadcast to multiple UEs 115. For example, relay device 1105 may broadcast the network coded combined message 1110-*c* to UEs 115-*q* and 115-*r*, where the network coded combined message may include sidelink messages 1110-*a* and 1110-*b*. Doing so may reduce resource use, for example, in comparison to a separate unicast transmission to both UEs 115. The network coded combined message 1110-*c* may include or correspond to control information, as described herein, which may support identifying and decoding the network coded combined message 1110-*c*.

UEs 115-*q* and 115-*r* may retrieve sidelink message information from the network coded combined message 1110-*c*. For example, UE 115-*q* may derive sidelink message 1110-*b* from network coded combined message 1110-*c* using the content of sidelink message 1110-*a* (e.g., because UE 115-*q* transmitted sidelink message 1110-*a*). UE 115-*r* may also derive sidelink message 1110-*a* from network coded combined message 1110-*c* using the content of sidelink message 1110-*b* (e.g., because UE 115-*r* transmitted sidelink message 1110-*b*).

As described herein, network coding of sidelink message 1110-*c* may be implemented in a MAC layer, a PHY layer, an RLC layer, a PDCP layer, or an upper layer (e.g., V2X layer or Application layer) of a protocol stack. In some cases, a relay device 1105 may be configured to support UE-to-UE relaying using RLC PDUs (e.g., PC5-RLC PDUs) and may therefore perform network coding at the RLC layer. An indication that the network coded combined message 1110-*c* is a network coded retransmission of sidelink messages 1110-*a* and 1110-*c* may be configured to be different in respective headers of lower protocol layers (e.g., RLC, PDCP, or MAC layers), for example, based on one or more characteristics of a particular layer. Similarly, a message ID for sidelink messages 1110-*a* and 1110-*b* or an indication of the network coding algorithm may be configured to be different in different protocol layers, as described herein.

Figure 12:
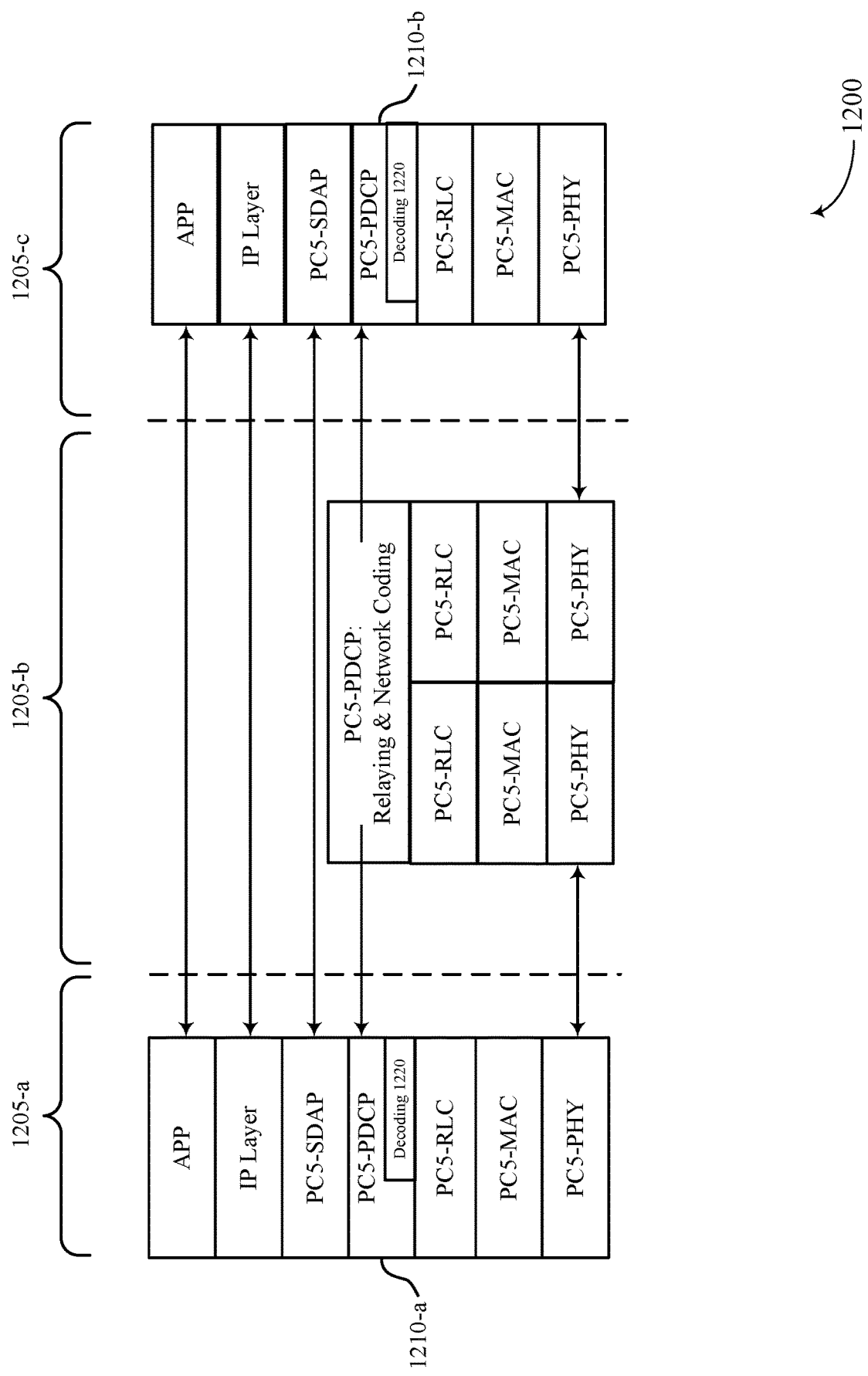
FIG. 12 illustrates an example of a protocol stack scheme in accordance with aspects of the present disclosure.

FIG. 12 illustrates an example of a protocol stack scheme 1200 in accordance with aspects of the present disclosure. In some examples, protocol stack scheme 1200 may implement aspects of wireless communications system 100 or 200. For example, protocol stack scheme 1200 may be implemented by a first UE 115, a second UE 115, and a relay device 205, where the first and second UEs 115 may represent respective examples of a UE 115 as described with reference to FIGS. 1-11 and the relay device 205 may represent an example of a relay device 205 described with reference to FIGS. 2-11. Protocol stack scheme 1200 may include a respective protocol stack 1205 for the first UE 115, the second UE 115, and the relay device 205, for example, where the respective protocol stacks 1205 may be used for network coding a sidelink transmission.

FIG. 12 depicts protocol stacks 1205 for connection-based network coding. In the depicted scheme, network coding may be performed at the PC5-PDCP layer. For example, protocol stack 1205-*a* may correspond to the first UE 115 and protocol stack 1205-*b* may correspond to the second UE 115. The first and second UEs 115 may receive a network coded combined message from the relay device 205, for example, as described with reference to FIG. 11 (e.g., using connection-based network coding). In some cases, the network coding may be performed or activated at a PDCP layer (e.g., a PC5-RLC layer) of a protocol stack 1205-*b*, or may be performed or activated at a higher layer and implemented in the PDCP layer.

As described herein, the first UE 115 may transmit a first sidelink message to the second UE 115 and the second UE 115 may transmit a second sidelink message to the first UE 115 (e.g., as a unicast, groupcast, or broadcast transmission), and in some cases, the first and/or second UE 115 may fail to receive or decode the respective sidelink message. The relay device 205 may also receive the sidelink messages and may determine that the sidelink messages are configured for network coding based on an indication in or corresponding to the respective sidelink messages (e.g., at the PDCP layer 1210-*a* or 1210-*b*). The relay device 205 may determine to retransmit the sidelink messages in the network coded combined message, for example, based on the indication and based on the first and/or second UE 115 failing to receive or decode the sidelink message. As described herein, in some cases, the relay device 205 may determine to generate the network coded combined message based on feedback between the second UE 115 and the first UE 115 (e.g., indicating a failure to decode one of the sidelink messages).

Protocol stack 1205-*b* may correspond to the relay device 205 and may represent an example of a protocol stack 1205 for a network coded combined message. In some cases, the relay device 205 may perform the network coding for the combined sidelink message at or above the PDCP layer 1210. The network coding may also be implemented with a relay function for relaying the sidelink messages. The relay device 205 may include control information in SCI for the network coded combined message and, for example, in a header of an PDCP PDU of the network coded combined message. As described herein, the control information may include an indication that the network coded combined message includes multiple sidelink messages combined via network coding.

The control information may also include an indication identifying sidelink messages within the network coded combined message, for example, using a sequence number for the PDCP PDU of the respective sidelink message. The control information may additionally or alternatively include an indication of a transmitting UE 115 for a respective sidelink message, as well as an indication of the network coding algorithm used for the network coded combined message.

The relay device 205 may transmit the network coded combined message (e.g., and corresponding control information) to the first and second UEs 115 (e.g., in a groupcast or broadcast transmission). In some cases, the relay device 205 may indicate (e.g., via the network coded combined message or associated control information) a number of supported retransmissions of the network coded combined message (e.g., a number of configured retransmissions).

Protocol stacks 1205-a and 1205-c may represent respective examples of a protocol stack 1205 for decoding the network coded combined message. The first and second UEs 115 may deliver PDCP PDUs to the upper layers of protocol stack 1205-a and 1205-c, respectively, using one or more configured procedures (e.g., using one or more configured procedures for non-network coded messages). The PDCP layer 1210 of protocol stack 1205-a and 1205-c may further store any PDCP SDUs configured for network coding for a time period or window for network coding (e.g., in a buffer), for example, after delivering the PDCP PDUs to the upper layers.

In some cases, the first and second UEs 115 may perform decoding 1220 for the combined sidelink message at or above the PDCP layer 1210. The first and second UEs 115 may also receive the network coded combined message and may perform feedback (e.g., HARQ feedback) using one or more procedures configured for sidelink message feedback. As described with reference to FIG. 11, the first and second UEs 115 may perform decoding 1220, such as using a network coding decoding function. The first and second UEs 115 may apply the network coding decoding function to recover missed sidelink messages, such as the sidelink message from the other UE 115.

Figure 13:
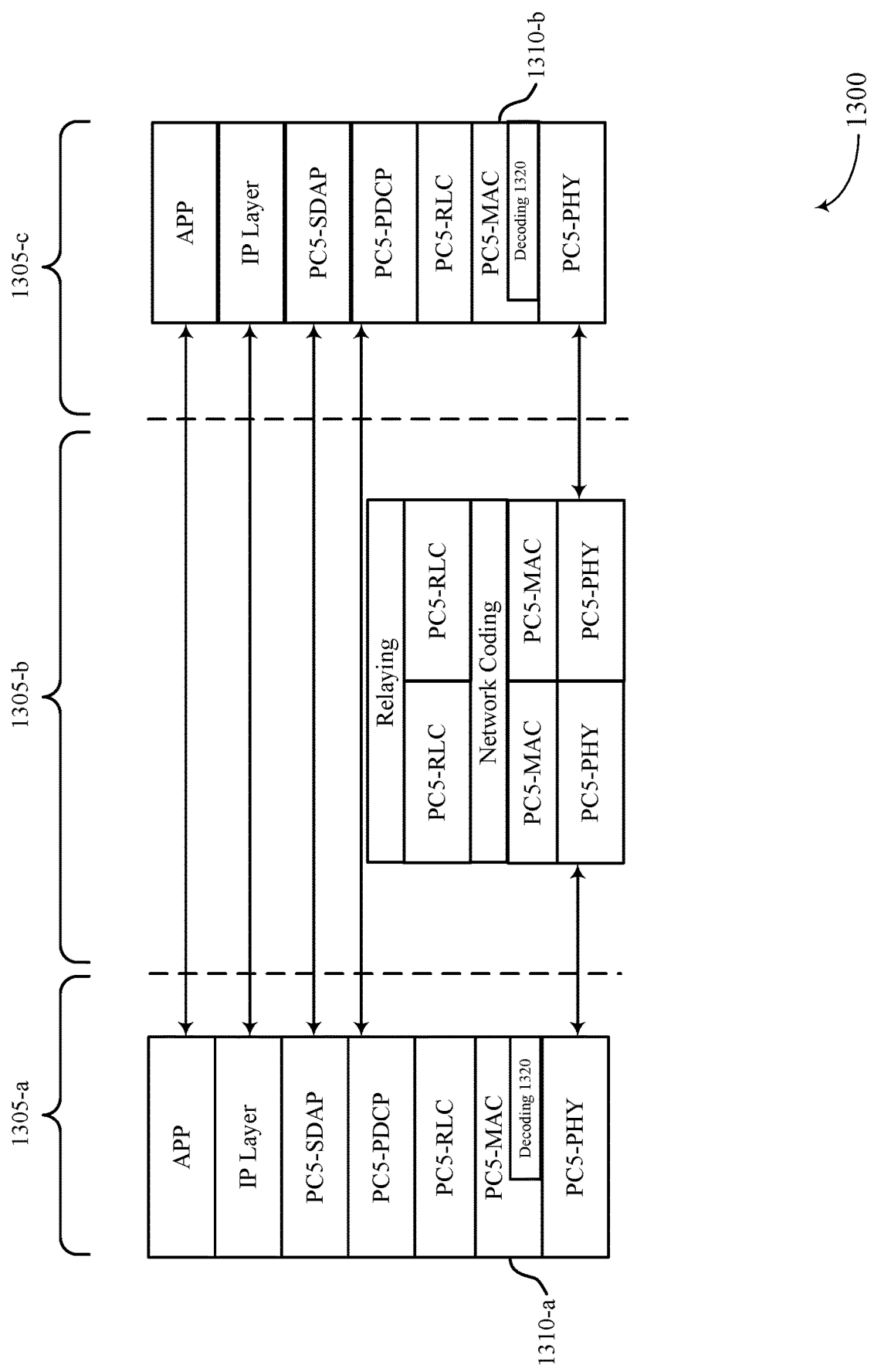
FIG. 13 illustrates an example of a protocol stack scheme in accordance with aspects of the present disclosure.

FIG. 13 illustrates an example of a protocol stack scheme 1300 in accordance with aspects of the present disclosure. In some examples, protocol stack scheme 1300 may implement aspects of wireless communications system 100 or 200. For example, protocol stack scheme 1300 may be implemented by a first UE 115, a second UE 115, and a relay device 205, where the first and second UEs 115 may represent respective examples of a UE 115 as described with reference to FIGS. 1-12 and the relay device 205 may represent an example of a relay device 205 described with reference to FIGS. 2-12. Protocol stack scheme 1300 may include a respective protocol stack 1305 for the first UE 115, the second UE 115, and the relay device 205, for example, where the respective protocol stacks 1305 may be used for network coding a sidelink transmission.

FIG. 13 depicts protocol stacks 1305 for connection-based network coding. In the depicted scheme, network coding may be performed at the PC5-MAC layer. For example, a protocol stack 1305-a may correspond to the first UE 115 and a protocol stack 1305-b may correspond to the second UE 115. The first and second UEs 115 may receive a network coded combined message from the relay device 205, for example, as described with reference to FIG. 11 (e.g., using connection-based network coding). In some cases, the network coding may be performed or activated at a MAC layer (e.g., a PC5-MAC layer) of protocol stack 1305-b, or may be performed or activated at a higher layer and implemented in the MAC layer.

As described herein, the first UE 115 may transmit a first sidelink message to the second UE 115 and the second UE may transmit a second sidelink message to the first UE 115 (e.g., as a unicast, groupcast, or broadcast transmission), and in some cases, the first and/or second UE 115 may fail to receive or decode the respective sidelink message. The relay device 205 may also receive the sidelink messages and may determine that the sidelink messages are configured for network coding based on an indication in or corresponding to the respective sidelink messages (e.g., at the MAC layer 1310-a or 1310-b). The relay device 205 may determine to retransmit the sidelink messages in the network coded combined message, for example, based on the indication and based on the first and/or second UE 115 failing to receive or decode the sidelink message. As described herein, in some cases, the relay device 205 may determine to generate the network coded combined message based on feedback between the second UE 115 and the first UE 115 (e.g., indicating a failure to decode one of the sidelink messages).

Protocol stack 1305-b may correspond to the relay device 205 and may represent an example of a protocol stack 1305 for a network coded combined message. In some cases, the relay device 205 may perform the network coding for the combined sidelink message at or above the MAC layer 1310. The relay device 205 may also implement a relay function for relaying the sidelink messages at a different layer, such as an RLC layer (e.g., PC5-RLC layer). The relay device 205 may include control information in SCI for the network coded combined message and, for example, in a header of a MAC PDU of the network coded combined message. As described herein, the control information may include an indication that the network coded combined message includes multiple sidelink messages combined via network coding.

The control information may also include an indication identifying sidelink messages within the network coded combined message, for example, using a sequence number for the MAC PDU of the respective sidelink message. The control information may additionally or alternatively include an indication of a transmitting UE 115 for a respective sidelink message, as well as an indication of the network coding algorithm used for the network coded combined message.

The relay device 205 may transmit the network coded combined message (e.g., and corresponding control information) to the first and second UEs 115 (e.g., in a groupcast or broadcast transmission). In some cases, the relay device 205 may indicate (e.g., via the network coded combined message or associated control information) a number of supported retransmissions of the network coded combined message (e.g., a number of configured retransmissions).

Protocol stacks 1305-a and 1305-c may represent respective examples of a protocol stack 1305 for decoding the network coded combined message. In some cases, the first and second UEs 115 may perform decoding 1320 for the combined sidelink message at or above the MAC layer 1310. The first and second UEs 115 may also receive the network coded combined message and may perform feedback (e.g., HARQ feedback) using one or more procedures configured for sidelink message feedback. As described with reference to FIG. 11, the first and second UEs 115 may perform decoding 1320, such as using a network coding decoding function. The first and second UEs 115 may apply the network coding decoding function to recover missed sidelink messages, such as the sidelink message from the other UE 115.

Figure 14:
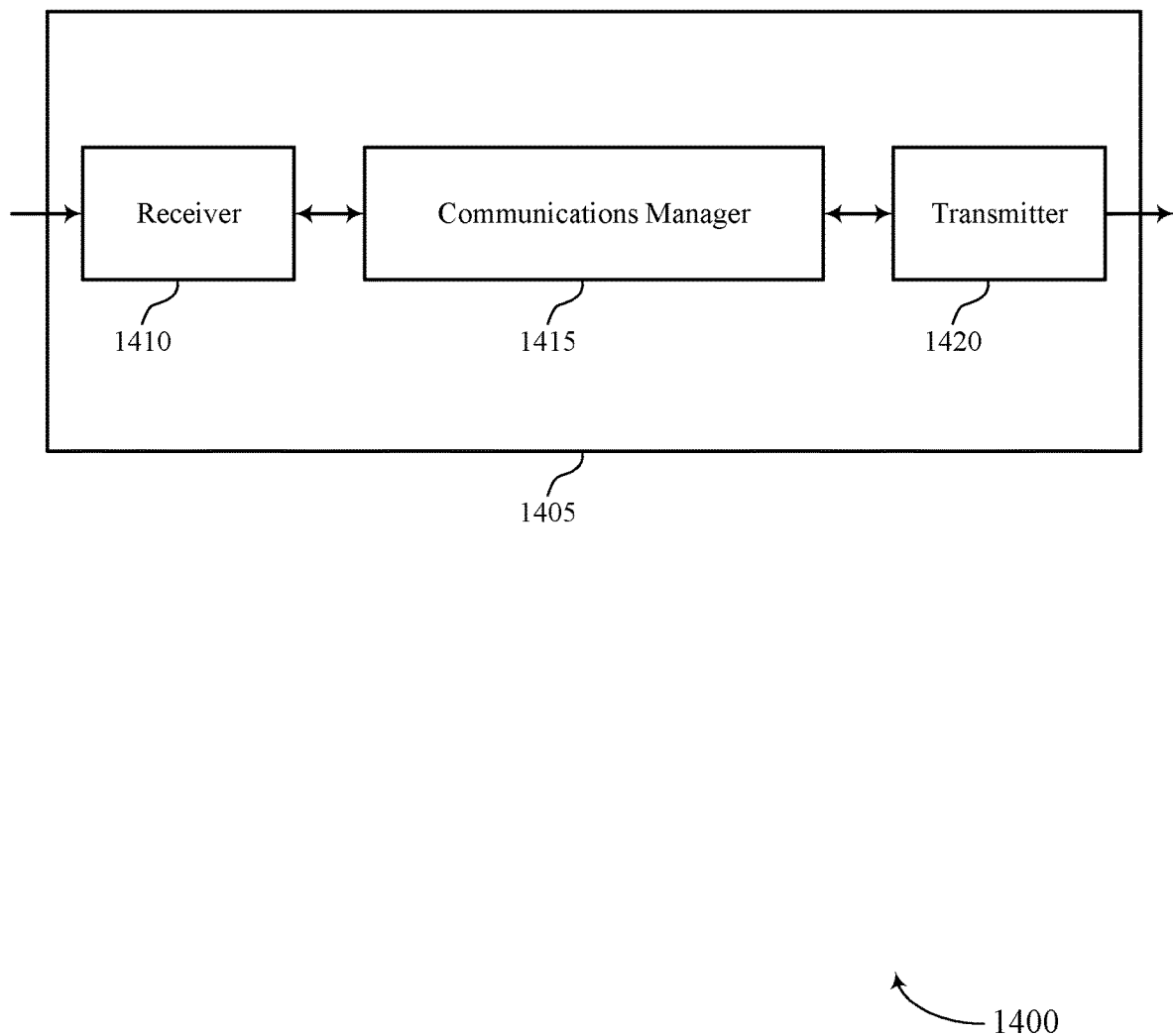
FIGS. 14 and 15 show block diagrams of devices in accordance with aspects of the present disclosure.

FIG. 14 shows a block diagram 1400 of a device 1405 in accordance with aspects of the present disclosure. The device 1405 may be an example of aspects of a wireless device (e.g., a UE 115 or a relay device) as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to control information for network coded sidelink transmissions, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive, via a sidelink channel, a first sidelink message having a first sequence number and addressed to a second wireless device, receive, via the sidelink channel, a second sidelink message having a second sequence number and addressed to the second wireless device, network coding the first and second sidelink messages to generate a network coded combined message, transmit, via the sidelink channel, control information indicating the first sequence number of the first sidelink message, the second sequence number of the second sidelink message, and that the network coded combined message is a retransmission of the first and second sidelink messages, and transmit, via the sidelink channel, the network coded combined message.

The communications manager 1415 may additionally or alternatively transmit, to a first wireless device via a sidelink channel, an indication that the second wireless device supports network coding for relayed transmissions, receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receive, via the sidelink channel, the network coded combined message, and decode the network coded combined message to obtain the first sidelink message, the second sidelink message, or both, based on the control information. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
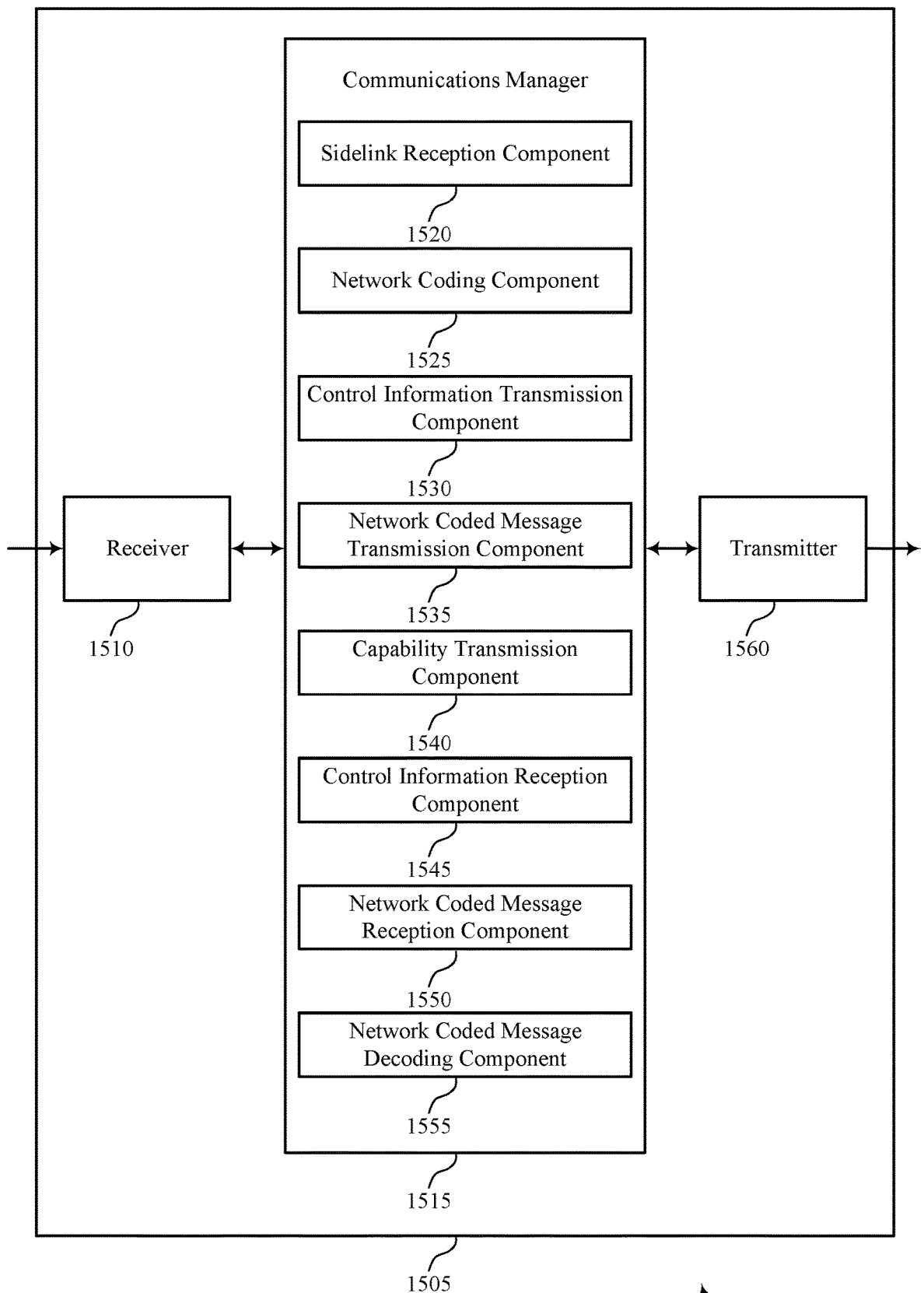

FIG. 15 shows a block diagram 1500 of a device 1505 in accordance with aspects of the present disclosure. The device 1505 may be an example of aspects of a device 1405, or a UE 115 as described herein. The device 1505 may include a receiver 1510, a communications manager 1515, and a transmitter 1560. The device 1505 may also include a processor. Each of these components may be in communication with one another (e.g., via one or more buses).

The receiver 1510 may receive information such as packets, user data, or control information associated with various information channels (e.g., control channels, data channels, and information related to control information for network coded sidelink transmissions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a sidelink reception component 1520, a network coding component 1525, a control information transmission component 1530, a network coded message transmission component 1535, a capability transmission component 1540, a control information reception component 1545, a network coded message reception component 1550, and a network coded message decoding component 1555. The communications manager 1515 may be an example of aspects of the communications manager 1710 described herein.

The sidelink reception component 1520 may receive, via a sidelink channel, a first sidelink message having a first sequence number and addressed to a second wireless device and receive, via the sidelink channel, a second sidelink message having a second sequence number and addressed to the second wireless device. The network coding component 1525 may network coding the first and second sidelink messages to generate a network coded combined message. The control information transmission component 1530 may transmit, via the sidelink channel, control information indicating the first sequence number of the first sidelink message, the second sequence number of the second sidelink message, and that the network coded combined message is a retransmission of the first and second sidelink messages. The network coded message transmission component 1535 may transmit, via the sidelink channel, the network coded combined message.

The capability transmission component 1540 may transmit, to a first wireless device via a sidelink channel, an indication that the second wireless device supports network coding for relayed transmissions. The control information reception component 1545 may receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device. The network coded message reception component 1550 may receive, via the sidelink channel, the network coded combined message. The network coded message decoding component 1555 may decode the network coded combined message to obtain the first sidelink message, the second sidelink message, or both, based on the control information.

The transmitter 1560 may transmit signals generated by other components of the device 1505. In some examples, the transmitter 1560 may be collocated with a receiver 1510 in a transceiver module. For example, the transmitter 1560 may be an example of aspects of the transceiver 1720 described with reference to FIG. 17. The transmitter 1560 may utilize a single antenna or a set of antennas.

Figure 16:
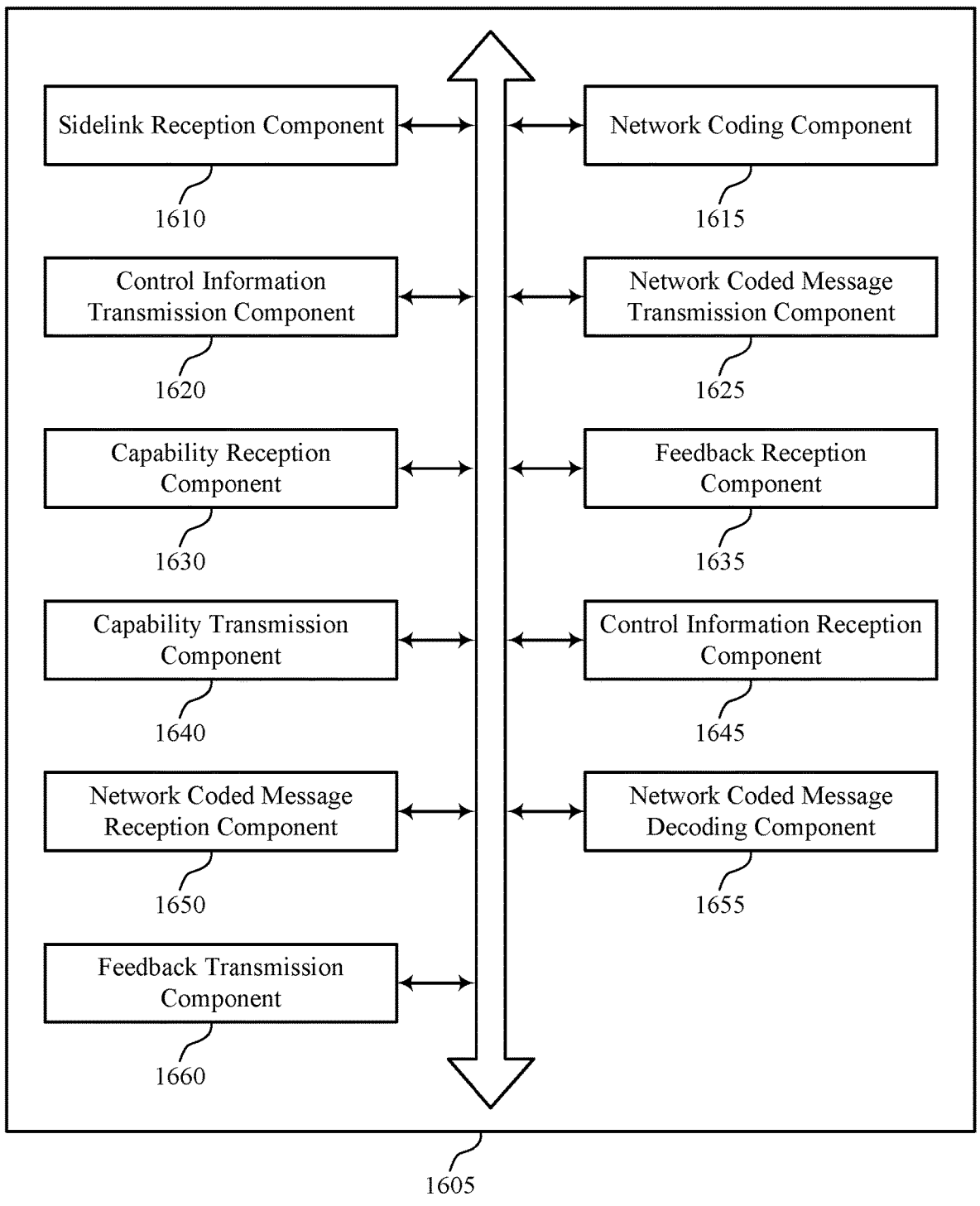
FIG. 16 shows a block diagram of a communications manager in accordance with aspects of the present disclosure.

FIG. 16 shows a block diagram 1600 of a communications manager 1605 in accordance with aspects of the present disclosure. The communications manager 1605 may be an example of aspects of a communications manager 1415, a communications manager 1515, or a communications manager 1710 described herein. The communications manager 1605 may include a sidelink reception component 1610, a network coding component 1615, a control information transmission component 1620, a network coded message transmission component 1625, a capability reception component 1630, a feedback reception component 1635, a capability transmission component 1640, a control information reception component 1645, a network coded message reception component 1650, a network coded message decoding component 1655, and a feedback transmission component 1660. Each of these modules may communicate, directly or indirectly, with one another (e.g., via one or more buses).

The sidelink reception component 1610 may receive, via a sidelink channel, a first sidelink message having a first sequence number and addressed to a second wireless device. In some examples, the sidelink reception component 1610 may receive, via the sidelink channel, a second sidelink message having a second sequence number and addressed to the second wireless device. In some examples, the sidelink reception component 1610 may receive the first sidelink message via a first unicast connection with a third wireless device, the first sidelink message addressed to a fourth wireless device. In some examples, the sidelink reception component 1610 may receive the second sidelink message via a second unicast connection with the fourth wireless device, the second sidelink message addressed to the third wireless device.

The network coding component 1615 may network code the first and second sidelink messages to generate a network coded combined message. In some examples, the network coding component 1615 may network code the first and second sidelink messages based on receiving the first and second sidelink messages within a same time window.

The control information transmission component 1620 may transmit, via the sidelink channel, control information indicating the first sequence number of the first sidelink message, the second sequence number of the second sidelink message, and that the network coded combined message is a retransmission of the first and second sidelink messages. In some examples, the control information transmission component 1620 may transmit an indication of a supported number of retransmissions for the network coded combined message, where the network coded combined message is transmitted in accordance with the indication of the supported number of retransmissions.

In some examples, the control information transmission component 1620 may transmit the control information that indicates a feedback PID associated with the network coded combined message. In some examples, the control information transmission component 1620 may transmit the control information that indicates a network coding algorithm applied to generate the network coded combined message. In some examples, the control information transmission component 1620 may transmit the control information that indicates a source ID of a UE that transmitted the first sidelink message, the second sidelink message, or both. In some examples, the control information transmission component 1620 may transmit the control information as sidelink control information.

In some examples, the control information transmission component 1620 may transmit the control information in a header of the network coded combined message. In some examples, transmitting the control information that includes the first sequence number, the second sequence number, or both, in a sequence number field of the header. In some cases, the sidelink control information includes a format SCI-1, a format SCI-2, or a different sidelink control information format.

The network coded message transmission component 1625 may transmit, via the sidelink channel, the network coded combined message. In some examples, the network coded message transmission component 1625 may transmit, based on the negative feedback message, a retransmission of the network coded combined message.

In some cases, the network coded combined message includes a PDU for a MAC layer, an RLC layer, a PDCP layer, or any combination thereof. In some cases, the first sequence number and the second sequence number are associated with a respective PDU. In some cases, the network coded combined message is transmitted via a unicast sidelink transmission or a groupcast sidelink transmission.

The capability reception component 1630 may receive a capability indication that the second wireless device supports network coding for relayed transmissions, where the network coded combined message is transmitted to the second wireless device via the sidelink channel based on the capability indication.

The feedback reception component 1635 may receive a negative feedback message associated with the feedback PID. In some examples, the feedback reception component 1635 may receive one or more negative feedback messages addressed to one or more UEs that transmitted one or both of the first and second sidelink messages, where the network coded combined message is transmitted based on the one or more negative feedback messages. In some examples, the feedback reception component 1635 may receive a feedback report including the one or more negative feedback messages, where network coding the first and second sidelink messages is based on the feedback report.

In some examples, the feedback reception component 1635 may receive a negative feedback message that indicates a feedback ID associated with one of the first and second sidelink messages and one of the first and second sequence numbers, where the network coded combined message is transmitted based on the negative feedback message.

The capability transmission component 1640 may transmit, to a first wireless device via a sidelink channel, an indication that the second wireless device supports network coding for relayed transmissions.

The control information reception component 1645 may receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device. In some examples, the control information reception component 1645 may receive an indication of a supported number of retransmissions for the network coded combined message, where the network coded combined message is received in accordance with the indication of the supported number of retransmissions.

In some examples, the control information reception component 1645 may receive the control information that indicates a feedback PID associated with the network coded combined message. In some examples, the control information reception component 1645 may receive the control information that indicates a network coding algorithm applied to generate the network coded combined message. In some examples, the control information reception component 1645 may receive the control information that indicates a source ID of a UE that transmitted the first sidelink message, the second sidelink message, or both.

In some examples, the control information reception component 1645 may receive the control information as sidelink control information. In some examples, the control information reception component 1645 may receive the control information in a header of the network coded combined message. In some examples, receiving the control information that includes the first sequence number, the second sequence number, or both, in a sequence number field of the header. In some cases, the sidelink control information includes a format SCI-1, a format SCI-2, or a different sidelink control information format.

The network coded message reception component 1650 may receive, via the sidelink channel, the network coded combined message. In some examples, the network coded message reception component 1650 may receive, based on the negative feedback message, a retransmission of the network coded combined message. In some cases, the network coded combined message includes a PDU for a MAC layer, an RLC layer, a PDCP layer, or any combination thereof. In some cases, the first sequence number and the second sequence number are associated with a respective PDU. In some cases, the network coded combined message is received via a unicast sidelink transmission or a groupcast sidelink transmission.

The network coded message decoding component 1655 may decode the network coded combined message to obtain the first sidelink message, the second sidelink message, or both, based on the control information.

The feedback transmission component 1660 may transmit a negative feedback message associated with the feedback PID. In some examples, the feedback transmission component 1660 may transmit one or more negative feedback messages addressed to one or more UEs that transmitted one or both of the first and second sidelink messages, where the network coded combined message is received based on the one or more negative feedback messages.

In some examples, the feedback transmission component 1660 may transmit a feedback report including the one or more negative feedback messages, where the network coded combined message is received based on the feedback report. In some examples, the feedback transmission component 1660 may transmit a negative feedback message that indicates a feedback ID associated with one of the first and second sidelink messages and one of the first and second sequence numbers, where the network coded combined message is received based on the negative feedback message.

Figure 17:
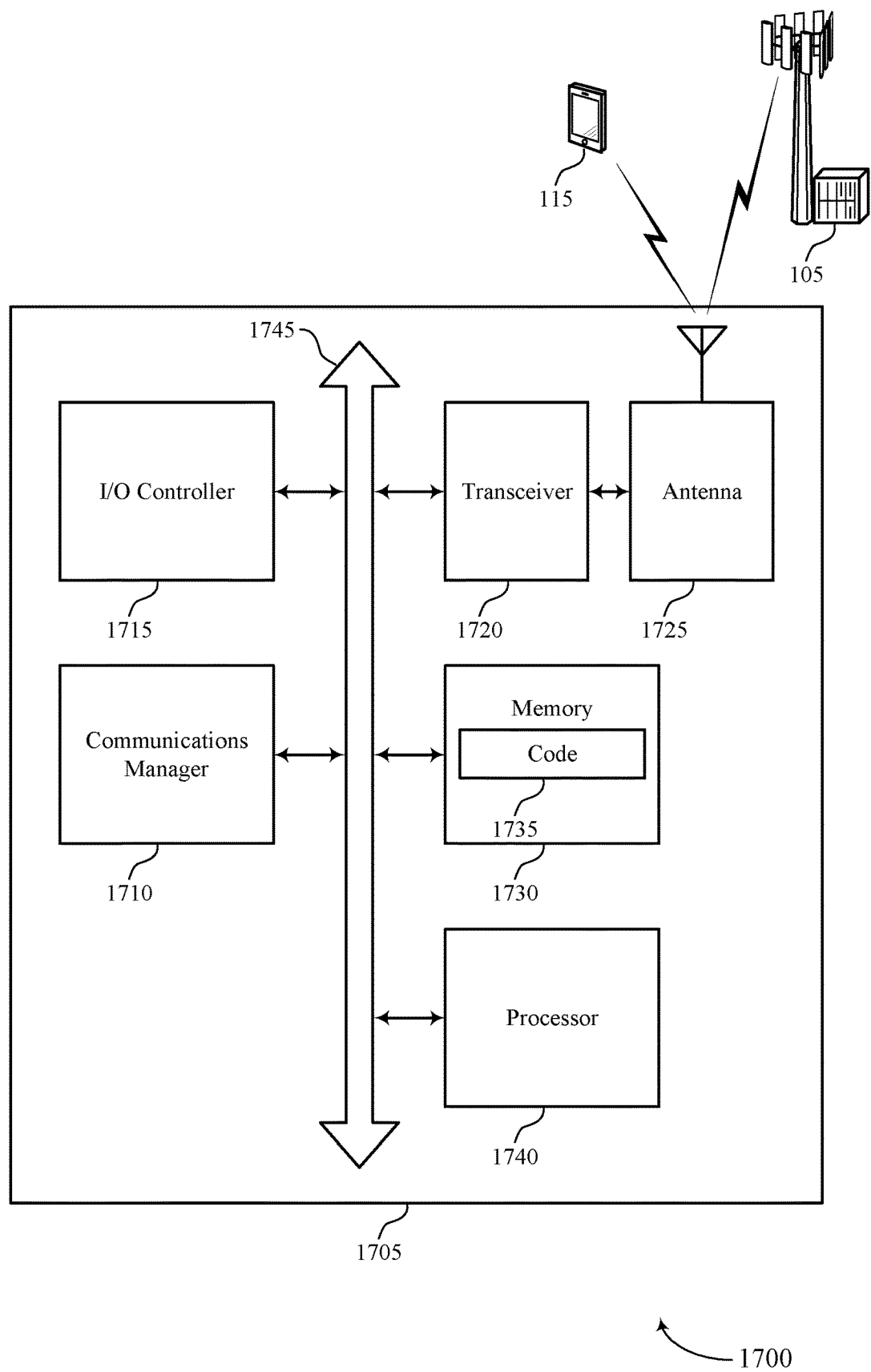
FIG. 17 shows a diagram of a system including a device in accordance with aspects of the present disclosure.

FIG. 17 shows a diagram of a system 1700 including a device 1705 in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may receive, via a sidelink channel, a first sidelink message having a first sequence number and addressed to a second wireless device, receive, via the sidelink channel, a second sidelink message having a second sequence number and addressed to the second wireless device, network coding the first and second sidelink messages to generate a network coded combined message, transmit, via the sidelink channel, control information indicating the first sequence number of the first sidelink message, the second sequence number of the second sidelink message, and that the network coded combined message is a retransmission of the first and second sidelink messages, and transmit, via the sidelink channel, the network coded combined message.

The communications manager 1710 may also transmit, to a first wireless device via a sidelink channel, an indication that the second wireless device supports network coding for relayed transmissions, receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device, receive, via the sidelink channel, the network coded combined message, and decode the network coded combined message to obtain the first sidelink message, the second sidelink message, or both, based on the control information.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WIN- DOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include random access memory (RAM) and read only memory (ROM). The memory 1730 may store computer-readable, computer-executable code 1735 including instructions that, when executed, cause the processor to perform various functions described herein. In some cases, the memory 1730 may contain, among other things, a basic I/O system (BIOS) which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting control information for network coded sidelink transmissions).

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
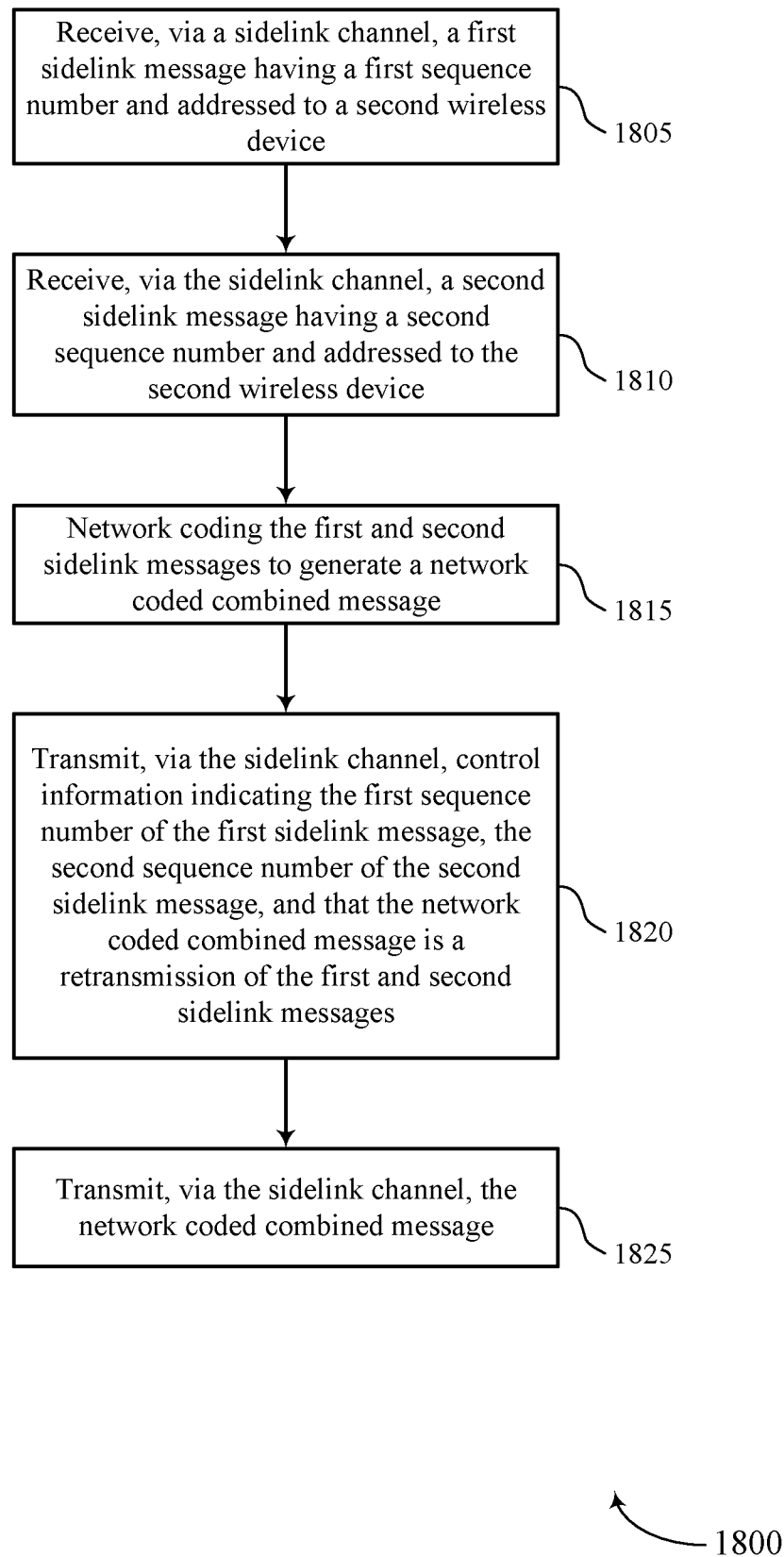
FIGS. 18 through 21 show flowcharts illustrating methods in accordance with aspects of the present disclosure.

FIG. 18 shows a flowchart illustrating a method 1800 in accordance with aspects of the present disclosure. The operations of method 1800 may be implemented by a first wireless device (e.g., a UE 115 or a relay device) or its components as described herein. For example, the operations of method 1800 may be performed by a communications manager as described with reference to FIGS. 14 through 17. In some examples, a wireless device may execute a set of instructions to control the functional elements of the first wireless device to perform the functions described below. Additionally or alternatively, a wireless device may perform aspects of the functions described below using special-purpose hardware.

At 1805, the first wireless device may receive, via a sidelink channel, a first sidelink message having a first sequence number and addressed to a second wireless device. The operations of 1805 may be performed according to the methods described herein. In some examples, aspects of the operations of 1805 may be performed by a sidelink reception component as described with reference to FIGS. 14 through 17.

At 1810, the first wireless device may receive, via the sidelink channel, a second sidelink message having a second sequence number and addressed to the second wireless device. The operations of 1810 may be performed according to the methods described herein. In some examples, aspects of the operations of 1810 may be performed by a sidelink reception component as described with reference to FIGS. 14 through 17.

At 1815, the first wireless device may network code the first and second sidelink messages to generate a network coded combined message. The operations of 1815 may be performed according to the methods described herein. In some examples, aspects of the operations of 1815 may be performed by a network coding component as described with reference to FIGS. 14 through 17.

At 1820, the first wireless device may transmit, via the sidelink channel, control information indicating the first sequence number of the first sidelink message, the second sequence number of the second sidelink message, and that the network coded combined message is a retransmission of the first and second sidelink messages. The operations of 1820 may be performed according to the methods described herein. In some examples, aspects of the operations of 1820 may be performed by a control information transmission component as described with reference to FIGS. 14 through 17.

At 1825, the first wireless device may transmit, via the sidelink channel, the network coded combined message. The operations of 1825 may be performed according to the methods described herein. In some examples, aspects of the operations of 1825 may be performed by a network coded message transmission component as described with reference to FIGS. 14 through 17.

Figure 19:
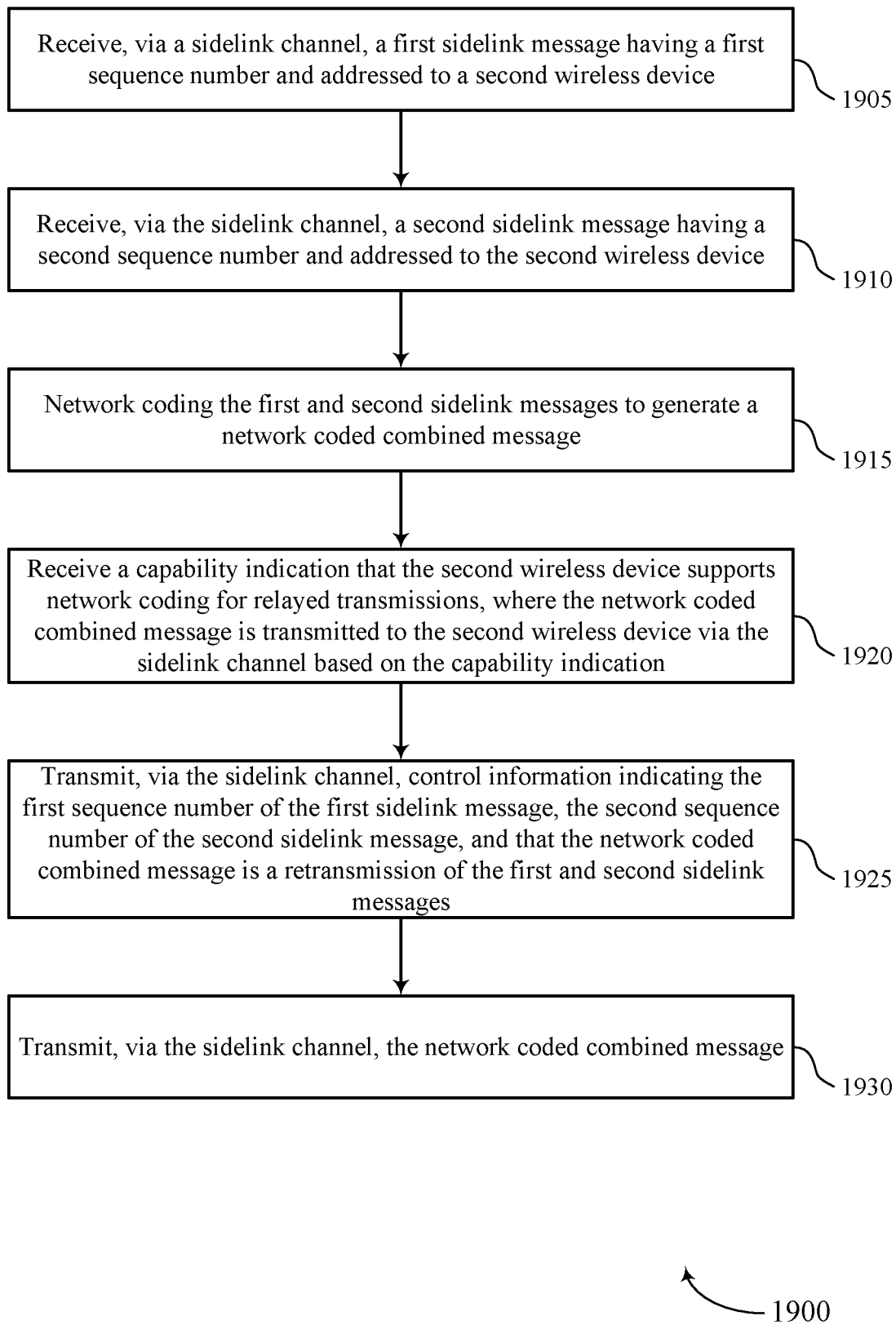

FIG. 19 shows a flowchart illustrating a method 1900 in accordance with aspects of the present disclosure. The operations of method 1900 may be implemented by a first wireless device (e.g., UE 115 or relay device) or its components as described herein. For example, the operations of method 1900 may be performed by a communications manager as described with reference to FIGS. 14 through 17. In some examples, a wireless device may execute a set of instructions to control the functional elements of the first wireless device to perform the functions described below. Additionally or alternatively, a wireless device may perform aspects of the functions described below using special-purpose hardware.

At 1905, the first wireless device may receive, via a sidelink channel, a first sidelink message having a first sequence number and addressed to a second wireless device. The operations of 1905 may be performed according to the methods described herein. In some examples, aspects of the operations of 1905 may be performed by a sidelink reception component as described with reference to FIGS. 14 through 17.

At 1910, the first wireless device may receive, via the sidelink channel, a second sidelink message having a second sequence number and addressed to the second wireless device. The operations of 1910 may be performed according to the methods described herein. In some examples, aspects of the operations of 1910 may be performed by a sidelink reception component as described with reference to FIGS. 14 through 17.

At 1915, the first wireless device may network code the first and second sidelink messages to generate a network coded combined message. The operations of 1915 may be performed according to the methods described herein. In some examples, aspects of the operations of 1915 may be performed by a network coding component as described with reference to FIGS. 14 through 17.

At 1920, the first wireless device may receive a capability indication that the second wireless device supports network coding for relayed transmissions, where the network coded combined message is transmitted to the second wireless device via the sidelink channel based on the capability indication. The operations of 1920 may be performed according to the methods described herein. In some examples, aspects of the operations of 1920 may be performed by a capability reception component as described with reference to FIGS. 14 through 17.

At 1925, the first wireless device may transmit, via the sidelink channel, control information indicating the first sequence number of the first sidelink message, the second sequence number of the second sidelink message, and that the network coded combined message is a retransmission of the first and second sidelink messages. The operations of 1925 may be performed according to the methods described herein. In some examples, aspects of the operations of 1925 may be performed by a control information transmission component as described with reference to FIGS. 14 through 17.

At 1930, the first wireless device may transmit, via the sidelink channel, the network coded combined message. The operations of 1930 may be performed according to the methods described herein. In some examples, aspects of the operations of 1930 may be performed by a network coded message transmission component as described with reference to FIGS. 14 through 17.

Figure 20:
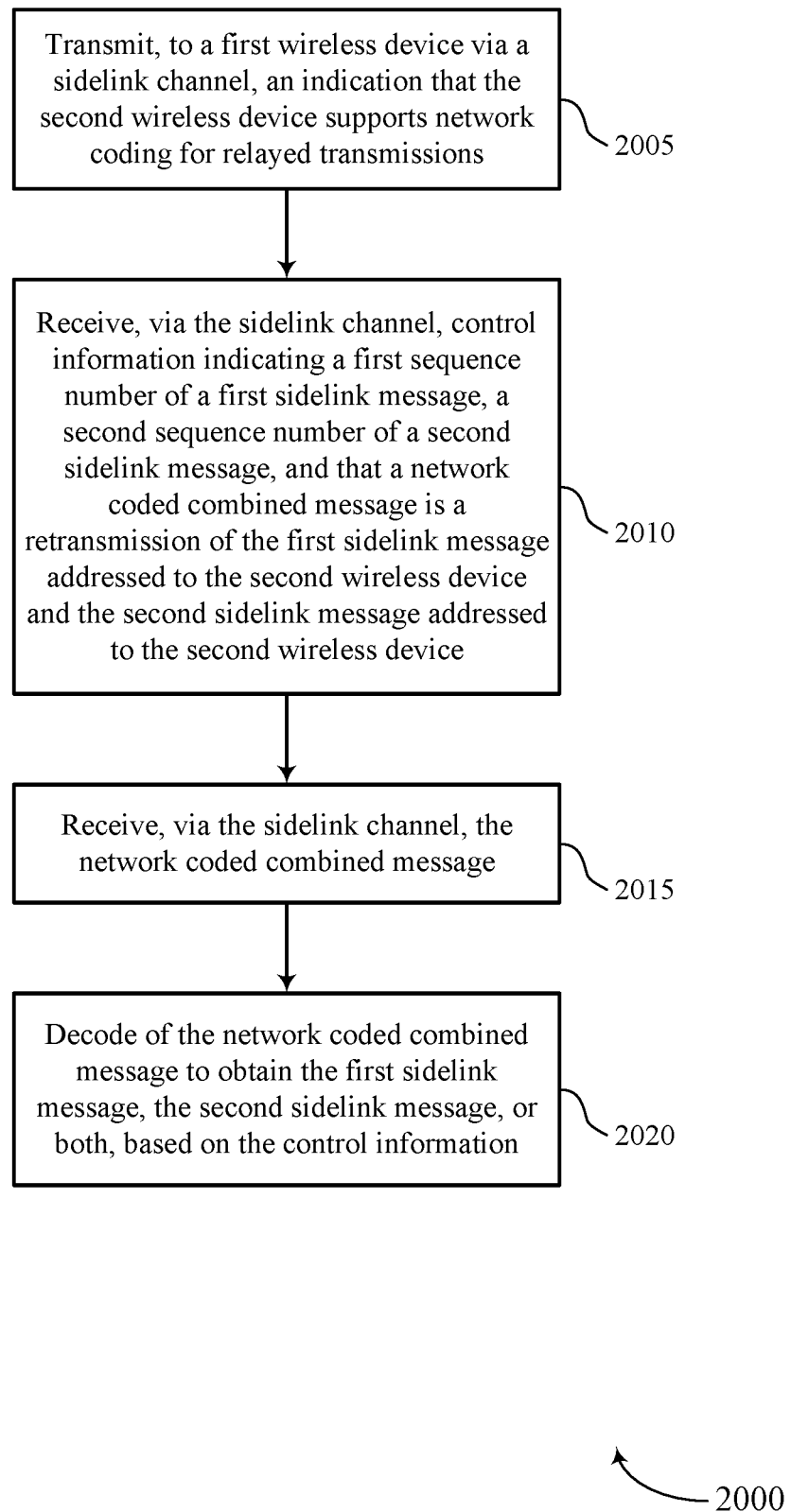

FIG. 20 shows a flowchart illustrating a method 2000 in accordance with aspects of the present disclosure. The operations of method 2000 may be implemented by a second wireless device (e.g., a UE 115 or a relay device) or its components as described herein. For example, the operations of method 2000 may be performed by a communications manager as described with reference to FIGS. 14 through 17. In some examples, a wireless device may execute a set of instructions to control the functional elements of the second wireless device to perform the functions described below. Additionally or alternatively, a wireless device may perform aspects of the functions described below using special-purpose hardware.

At 2005, the second wireless device may transmit, to a first wireless device via a sidelink channel, an indication that the second wireless device supports network coding for relayed transmissions. The operations of 2005 may be performed according to the methods described herein. In some examples, aspects of the operations of 2005 may be performed by a capability transmission component as described with reference to FIGS. 14 through 17.

At 2010, the second wireless device may receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device. The operations of 2010 may be performed according to the methods described herein. In some examples, aspects of the operations of 2010 may be performed by a control information reception component as described with reference to FIGS. 14 through 17.

At 2015, the second wireless device may receive, via the sidelink channel, the network coded combined message. The operations of 2015 may be performed according to the methods described herein. In some examples, aspects of the operations of 2015 may be performed by a network coded message reception component as described with reference to FIGS. 14 through 17.

At 2020, the second wireless device may decode the network coded combined message to obtain the first sidelink message, the second sidelink message, or both, based on the control information. The operations of 2020 may be performed according to the methods described herein. In some examples, aspects of the operations of 2020 may be performed by a network coded message decoding component as described with reference to FIGS. 14 through 17.

Figure 21:
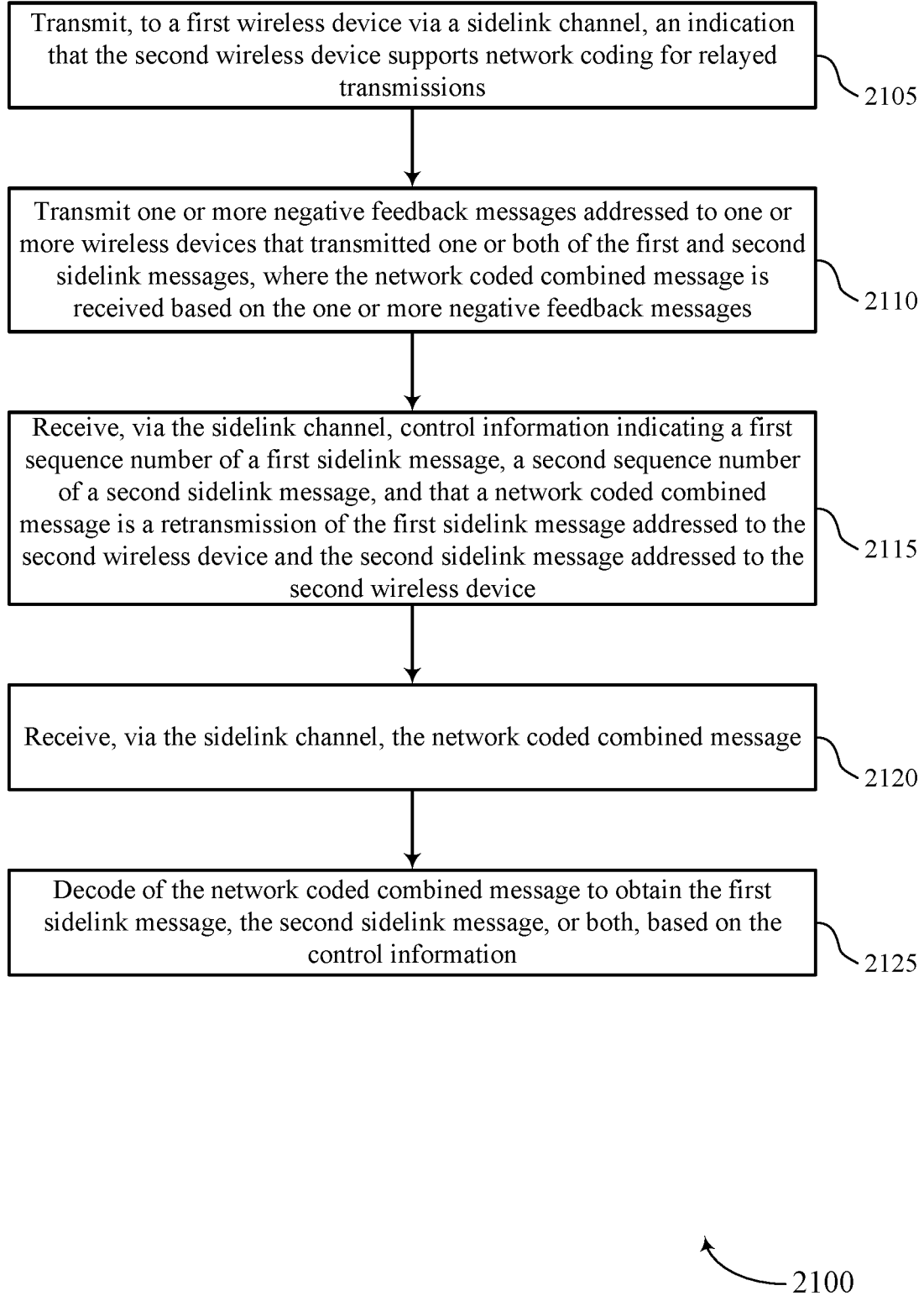

FIG. 21 shows a flowchart illustrating a method 2100 in accordance with aspects of the present disclosure. The operations of method 2100 may be implemented by a second wireless device (e.g., a UE 115 or a relay node) or its components as described herein. For example, the operations of method 2100 may be performed by a communications manager as described with reference to FIGS. 14 through 17. In some examples, a wireless device may execute a set of instructions to control the functional elements of the second wireless device to perform the functions described below. Additionally or alternatively, a wireless device may perform aspects of the functions described below using special-purpose hardware.

At 2105, the second wireless device may transmit, to a first wireless device via a sidelink channel, an indication that the second wireless device supports network coding for relayed transmissions. The operations of 2105 may be performed according to the methods described herein. In some examples, aspects of the operations of 2105 may be performed by a capability transmission component as described with reference to FIGS. 14 through 17.

At 2110, the second wireless device may transmit one or more negative feedback messages addressed to one or more wireless devices that transmitted one or both of the first and second sidelink messages, where the network coded combined message is received based on the one or more negative feedback messages. The operations of 2110 may be performed according to the methods described herein. In some examples, aspects of the operations of 2110 may be performed by a feedback transmission component as described with reference to FIGS. 14 through 17.

At 2115, the second wireless device may receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device. The operations of 2115 may be performed according to the methods described herein. In some examples, aspects of the operations of 2115 may be performed by a control information reception component as described with reference to FIGS. 14 through 17.

At 2120, the second wireless device may receive, via the sidelink channel, the network coded combined message. The operations of 2120 may be performed according to the methods described herein. In some examples, aspects of the operations of 2120 may be performed by a network coded message reception component as described with reference to FIGS. 14 through 17.

At 2125, the second wireless device may decode the network coded combined message to obtain the first sidelink message, the second sidelink message, or both, based on the control information. The operations of 2125 may be performed according to the methods described herein. In some examples, aspects of the operations of 2125 may be performed by a network coded message decoding component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless device, comprising: receiving, via a sidelink channel, a first sidelink message having a first sequence number and addressed to a second wireless device; receiving, via the sidelink channel, a second sidelink message having a second sequence number and addressed to the second wireless device; network coding the first and second sidelink messages to generate a network coded combined message; transmitting, via the sidelink channel, control information indicating the first sequence number of the first sidelink message, the second sequence number of the second sidelink message, and that the network coded combined message is a retransmission of the first and second sidelink messages; and transmitting, via the sidelink channel, the network coded combined message.

Aspect 2: The method of aspect 1, further comprising: receiving a capability indication that the second wireless device supports network coding for relayed transmissions, wherein the network coded combined message is transmitted to the second wireless device via the sidelink channel based at least in part on the capability indication.

Aspect 3: The method of any of aspects 1 through 2, further comprising: transmitting the control information that indicates a feedback PID associated with the network coded combined message.

Aspect 4: The method of aspect 3, further comprising: receiving a negative feedback message associated with the feedback PID; and transmitting, based at least in part on the negative feedback message, a retransmission of the network coded combined message.

Aspect 5: The method of aspect 4, further comprising: transmitting an indication of a supported number of retransmissions for the network coded combined message, wherein the network coded combined message is transmitted in accordance with the indication of the supported number of retransmissions.

Aspect 6: The method of any of aspects 1 through 5, further comprising: transmitting the control information that indicates a network coding algorithm applied to generate the network coded combined message.

Aspect 7: The method of any of aspects 1 through 6, further comprising: transmitting the control information that indicates a source ID of a wireless device that transmitted the first sidelink message, the second sidelink message, or both.

Aspect 8: The method of any of aspects 1 through 7, further comprising: receiving one or more negative feedback messages addressed to one or more wireless devices that transmitted one or both of the first and second sidelink messages, wherein the network coded combined message is transmitted based at least in part on the one or more negative feedback messages.

Aspect 9: The method of aspect 8, further comprising: receiving a feedback report comprising the one or more negative feedback messages, wherein network coding the first and second sidelink messages is based at least in part on the feedback report.

Aspect 10: The method of any of aspects 1 through 9, further comprising: receiving a negative feedback message that indicates a feedback ID associated with one of the first and second sidelink messages and one of the first and second sequence numbers, wherein the network coded combined message is transmitted based at least in part on the negative feedback message.

Aspect 11: The method of any of aspects 1 through 10, wherein the network coded combined message comprises a PDU for a MAC layer, an RLC layer, a PDCP layer, or any combination thereof.

Aspect 12: The method of aspect 11, wherein the first sequence number and the second sequence number are associated with a respective PDU.

Aspect 13: The method of any of aspects 1 through 12, wherein the network coded combined message is transmitted via a unicast sidelink transmission or a groupcast sidelink transmission.

Aspect 14: The method of any of aspects 1 through 13, further comprising: network coding the first and second sidelink messages based at least in part on receiving the first and second sidelink messages within a same time window.

Aspect 15: The method of any of aspects 1 through 14, further comprising: receiving the first sidelink message via a first unicast connection with a third wireless device, the first sidelink message addressed to a fourth wireless device; and receiving the second sidelink message via a second unicast connection with the fourth wireless device, the second sidelink message addressed to the third wireless device.

Aspect 16: The method of any of aspects 1 through 15, further comprising: transmitting the control information as SCI.

Aspect 17: The method of aspect 16, wherein the SCI comprises a format SCI-1, a format SCI-2, or a different SCI format.

Aspect 18: The method of any of aspects 1 through 17, further comprising: transmitting the control information in a header of the network coded combined message.

Aspect 19: The method of aspect 18, further comprising: transmitting the control information that comprises the first sequence number, the second sequence number, or both, in a sequence number field of the header.

Aspect 20: A method for wireless communication at a second wireless device, comprising: transmitting, to a first wireless device via a sidelink channel, an indication that the second wireless device supports network coding for relayed transmissions; receiving, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device; receiving, via the sidelink channel, the network coded combined message; and decoding the network coded combined message to obtain the first sidelink message, the second sidelink message, or both, based at least in part on the control information.

Aspect 21: The method of aspect 20, further comprising: receiving the control information that indicates a feedback PID associated with the network coded combined message.

Aspect 22: The method of aspect 21, further comprising: transmitting a negative feedback message associated with the feedback PID; and receiving, based at least in part on the negative feedback message, a retransmission of the network coded combined message.

Aspect 23: The method of aspect 22, further comprising: receiving an indication of a supported number of retransmissions for the network coded combined message, wherein the network coded combined message is received in accordance with the indication of the supported number of retransmissions.

Aspect 24: The method of any of aspects 20 through 23, further comprising: receiving the control information that indicates a network coding algorithm applied to generate the network coded combined message.

Aspect 25: The method of any of aspects 20 through 24, further comprising: receiving the control information that indicates a source ID of a wireless device that transmitted the first sidelink message, the second sidelink message, or both.

Aspect 26: The method of any of aspects 20 through 25, further comprising: transmitting one or more negative feedback messages addressed to one or more wireless devices that transmitted one or both of the first and second sidelink messages, wherein the network coded combined message is received based at least in part on the one or more negative feedback messages.

Aspect 27: The method of aspect 26, further comprising: transmitting a feedback report comprising the one or more negative feedback messages, wherein the network coded combined message is received based at least in part on the feedback report.

Aspect 28: The method of any of aspects 20 through 27, further comprising: transmitting a negative feedback message that indicates a feedback ID associated with one of the first and second sidelink messages and one of the first and second sequence numbers, wherein the network coded combined message is received based at least in part on the negative feedback message.

Aspect 29: The method of any of aspects 20 through 28, wherein the network coded combined message comprises a PDU for a MAC layer, an RLC layer, a PDCP layer, or any combination thereof.

Aspect 30: The method of aspect 29, wherein the first sequence number and the second sequence number are associated with a respective PDU.

Aspect 31: The method of any of aspects 20 through 30, wherein the network coded combined message is received via a unicast sidelink transmission or a groupcast sidelink transmission.

Aspect 32: The method of any of aspects 20 through 31, further comprising: receiving the control information as SCI.

Aspect 33: The method of aspect 32, wherein the SCI comprises a format SCI-1, a format SCI-2, or a different SCI format.

Aspect 34: The method of any of aspects 20 through 33, further comprising: receiving the control information in a header of the network coded combined message.

Aspect 35: The method of aspect 34, further comprising: receiving the control information that comprises the first sequence number, the second sequence number, or both, in a sequence number field of the header.

Aspect 36: An apparatus for wireless communication at a first wireless device, comprising a processor; memory coupled with the processor; and instructions stored in the memory and executable by the processor to cause the apparatus to perform a method of any of aspects 1 through 19.

Aspect 37: An apparatus for wireless communication at a first wireless device, comprising at least one means for performing a method of any of aspects 1 through 19.

Aspect 38: A non-transitory computer-readable medium storing code for wireless communication at a first wireless device, the code comprising instructions executable by a processor to perform a method of any of aspects 1 through 19.

Aspect 39: An apparatus for wireless communication at a second wireless device, comprising a processor; memory coupled with the processor; and instructions stored in the memory and executable by the processor to cause the apparatus to perform a method of any of aspects 20 through 35.

Aspect 40: An apparatus for wireless communication at a second wireless device, comprising at least one means for performing a method of any of aspects 20 through 35.

Aspect 41: A non-transitory computer-readable medium storing code for wireless communication at a second wireless device, the code comprising instructions executable by a processor to perform a method of any of aspects 20 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first wireless device, comprising:
   a processor;
   memory coupled with the processor; and
   instructions stored in the memory and executable by the processor to cause the apparatus to:
   receive, via a sidelink channel, a first sidelink message having a first sequence number and addressed to a second wireless device;
   receive, via the sidelink channel, a second sidelink message having a second sequence number and addressed to the second wireless device;
   network coding the first and second sidelink messages to generate a network coded combined message;
   transmit, via the sidelink channel, control information indicating the first sequence number of the first sidelink message, the second sequence number of the second sidelink message, and that the network coded combined message is a retransmission of the first and second sidelink messages; and
   transmit, via the sidelink channel, the network coded combined message.

2. The apparatus of claim 1, wherein the instructions are further executable to cause the apparatus to:
   receive a capability indication that the second wireless device supports network coding for relayed transmissions, wherein the network coded combined message is transmitted to the second wireless device via the sidelink channel based at least in part on the capability indication.

3. The apparatus of claim 1, wherein the instructions to transmit the control information are further executable to cause the apparatus to:
   transmit the control information that indicates a feedback process identifier associated with the network coded combined message.

4. The apparatus of claim 3, wherein the instructions are further executable to cause the apparatus to:
   receive a negative feedback message associated with the feedback process identifier; and
   transmit, based at least in part on the negative feedback message, a retransmission of the network coded combined message.

5. The apparatus of claim 4, wherein the instructions are further executable to cause the apparatus to:
   transmit an indication of a supported number of retransmissions for the network coded combined message, wherein the network coded combined message is transmitted in accordance with the indication of the supported number of retransmissions.

6. The apparatus of claim 1, wherein the instructions to transmit the control information are further executable to cause the apparatus to:
   transmit the control information that indicates a network coding algorithm applied to generate the network coded combined message.

7. The apparatus of claim 1, wherein the instructions to transmit the control information are further executable to cause the apparatus to:
   transmit the control information that indicates a source identifier of a wireless device that transmitted the first sidelink message, the second sidelink message, or both.

8. The apparatus of claim 1, wherein the instructions are further executable to cause the apparatus to:
   receive one or more negative feedback messages addressed to one or more wireless devices that transmitted one or both of the first and second sidelink messages, wherein the network coded combined message is transmitted based at least in part on the one or more negative feedback messages.

9. The apparatus of claim 8, wherein the instructions are further executable to cause the apparatus to:
   receive a feedback report comprising the one or more negative feedback messages, wherein network coding the first and second sidelink messages is based at least in part on the feedback report.

10. The apparatus of claim 1, wherein the instructions are further executable to cause the apparatus to:
    receive a negative feedback message that indicates a feedback identifier associated with one of the first and second sidelink messages and one of the first and second sequence numbers, wherein the network coded combined message is transmitted based at least in part on the negative feedback message.

11. The apparatus of claim 1, wherein the network coded combined message comprises a protocol data unit for a medium access control layer, a radio link control layer, a packet data convergence protocol layer, or any combination thereof.

12. The apparatus of claim 11, wherein the first sequence number and the second sequence number are associated with a respective protocol data unit.

13. The apparatus of claim 1, wherein the network coded combined message is transmitted via a unicast sidelink transmission or a groupcast sidelink transmission.

14. The apparatus of claim 1, wherein the instructions are further executable to cause the apparatus to:
    network code the first and second sidelink messages based at least in part on receiving the first and second sidelink messages within a same time window.

15. The apparatus of claim 1, wherein the instructions are further executable to cause the apparatus to:
    receive the first sidelink message via a first unicast connection with a third wireless device, the first sidelink message addressed to a fourth wireless device; and
    receive the second sidelink message via a second unicast connection with the fourth wireless device, the second sidelink message addressed to the third wireless device.

16. The apparatus of claim 1, wherein the instructions are further executable to cause the apparatus to:
    transmit the control information in a header of the network coded combined message.

17. An apparatus for wireless communication at a second wireless device, comprising:
    a processor;
    memory coupled with the processor; and
    instructions stored in the memory and executable by the processor to cause the apparatus to:
      transmit, to a first wireless device via a sidelink channel, an indication that the second wireless device supports network coding for relayed transmissions;
      receive, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device;
      receive, via the sidelink channel, the network coded combined message; and
      decode the network coded combined message to obtain the first sidelink message, the second sidelink message, or both, based at least in part on the control information.

18. The apparatus of claim 17, wherein the instructions to receive the control information are further executable to cause the apparatus to:
    receive the control information that indicates a feedback process identifier associated with the network coded combined message.

19. The apparatus of claim 18, wherein the instructions are further executable to cause the apparatus to:
    transmit a negative feedback message associated with the feedback process identifier; and
    receive, based at least in part on the negative feedback message, a retransmission of the network coded combined message.

20. The apparatus of claim 19, wherein the instructions are further executable to cause the apparatus to:
    receive an indication of a supported number of retransmissions for the network coded combined message, wherein the network coded combined message is received in accordance with the indication of the supported number of retransmissions.

21. The apparatus of claim 17, wherein the instructions to receive the control information are further executable to cause the apparatus to:
    receive the control information that indicates a network coding algorithm applied to generate the network coded combined message.

22. The apparatus of claim 17, wherein the instructions to receive the control information are further executable to cause the apparatus to:
    receive the control information that indicates a source identifier of a wireless device that transmitted the first sidelink message, the second sidelink message, or both.

23. The apparatus of claim 17, wherein the instructions are further executable to cause the apparatus to:
    transmit one or more negative feedback messages addressed to one or more wireless devices that transmitted one or both of the first and second sidelink messages, wherein the network coded combined message is received based at least in part on the one or more negative feedback messages.

24. The apparatus of claim 23, wherein the instructions are further executable to cause the apparatus to:
    transmit a feedback report comprising the one or more negative feedback messages, wherein the network coded combined message is received based at least in part on the feedback report.

25. The apparatus of claim 17, wherein the instructions are further executable to cause the apparatus to:
- transmit a negative feedback message that indicates a feedback identifier associated with one of the first and second sidelink messages and one of the first and second sequence numbers, wherein the network coded combined message is received based at least in part on the negative feedback message.

26. The apparatus of claim 17, wherein the network coded combined message comprises a protocol data unit for a medium access control layer, a radio link control layer, a packet data convergence protocol layer, or any combination thereof.

27. The apparatus of claim 26, wherein the first sequence number and the second sequence number are associated with a respective protocol data unit.

28. The apparatus of claim 17, wherein the network coded combined message is received via a unicast sidelink transmission or a groupcast sidelink transmission.

29. A method for wireless communication at a first wireless device, comprising:
- receiving, via a sidelink channel, a first sidelink message having a first sequence number and addressed to a second wireless device;
- receiving, via the sidelink channel, a second sidelink message having a second sequence number and addressed to the second wireless device;
- network coding the first and second sidelink messages to generate a network coded combined message;
- transmitting, via the sidelink channel, control information indicating the first sequence number of the first sidelink message, the second sequence number of the second sidelink message, and that the network coded combined message is a retransmission of the first and second sidelink messages; and
- transmitting, via the sidelink channel, the network coded combined message.

30. A method for wireless communication at a second wireless device, comprising:
- transmitting, to a first wireless device via a sidelink channel, an indication that the second wireless device supports network coding for relayed transmissions;
- receiving, via the sidelink channel, control information indicating a first sequence number of a first sidelink message, a second sequence number of a second sidelink message, and that a network coded combined message is a retransmission of the first sidelink message addressed to the second wireless device and the second sidelink message addressed to the second wireless device;
- receiving, via the sidelink channel, the network coded combined message; and
- decoding the network coded combined message to obtain the first sidelink message, the second sidelink message, or both, based at least in part on the control information.

* * * * *